United States Patent
Yanagisawa et al.

(10) Patent No.: US 10,458,817 B2
(45) Date of Patent: Oct. 29, 2019

(54) SENSOR MANUFACTURING METHOD AND SENSOR

(71) Applicant: NSK LTD., Tokyo (JP)

(72) Inventors: Tomoyuki Yanagisawa, Kanagawa (JP); Minoru Kubokawa, Kanagawa (JP); Toshiaki Oguchi, Kanagawa (JP); Hideki Furukawa, Kanagawa (JP); Yasuhiro Kawai, Kanagawa (JP)

(73) Assignee: NSK LTD., Tokyo (JP)

( * ) Notice: Subject to any disclaimer, the term of this patent is extended or adjusted under 35 U.S.C. 154(b) by 158 days.

(21) Appl. No.: 15/743,090

(22) PCT Filed: Feb. 25, 2016

(86) PCT No.: PCT/JP2016/055720
§ 371 (c)(1),
(2) Date: Jan. 9, 2018

(87) PCT Pub. No.: WO2017/022260
PCT Pub. Date: Feb. 9, 2017

(65) Prior Publication Data
US 2019/0078911 A1 Mar. 14, 2019

(30) Foreign Application Priority Data
Aug. 3, 2015 (JP) .................. 2015-153453

(51) Int. Cl.
*G01D 5/34* (2006.01)
*G01D 5/347* (2006.01)
(Continued)

(52) U.S. Cl.
CPC ......... *G01D 5/34738* (2013.01); *G01D 5/147* (2013.01); *G01D 5/245* (2013.01);
(Continued)

(58) Field of Classification Search
CPC .... G01D 5/34738; G01D 5/341; G01D 5/245; G01D 5/34715; G01D 5/147; G01D 5/12
(Continued)

(56) References Cited

U.S. PATENT DOCUMENTS

| 8,258,460 B2* | 9/2012 | Lin | ................... G01D 5/34715 250/231.13 |
| 2007/0262249 A1* | 11/2007 | Lee | ........................ G01D 5/347 250/231.13 |

FOREIGN PATENT DOCUMENTS

| JP | 07-209310 A | 8/1995 |
| JP | 09-126817 A | 5/1997 |

(Continued)

OTHER PUBLICATIONS

International Search Report for PCT/JP2016/055720 dated May 24, 2016 [PCT/ISA/210].

*Primary Examiner* — Seung C Sohn
(74) *Attorney, Agent, or Firm* — Sughrue Mion, PLLC

(57) ABSTRACT

A sensor manufacturing method is a method for manufacturing a sensor including a generator that generates a predetermined detection target, a detector that detects the detection target generated by the generator, and a motion body that performs motion in the area in between the generator and the detector. In the method, the generator and the detector are positioned opposite to each other by either curving or bending a substrate including a first portion having the generator installed thereon and a second portion having the detector installed thereon that are formed in an integrated manner, and the substrate and the motion body are made to perform relative movement in such a way that the motion body enters the area in between the generator and the detector.

10 Claims, 17 Drawing Sheets

(51) Int. Cl.
　　　*G01D 5/14*　　　(2006.01)
　　　*G01D 5/245*　　(2006.01)
　　　*G01D 5/12*　　　(2006.01)

(52) U.S. Cl.
　　　CPC ......... *G01D 5/341* (2013.01); *G01D 5/34715*
　　　　　　　　(2013.01); *G01D 5/12* (2013.01)

(58) Field of Classification Search
　　　USPC ...................................... 250/231.13–231.18
　　　See application file for complete search history.

(56) References Cited

FOREIGN PATENT DOCUMENTS

| | | |
|---|---|---|
| JP | 2001-027551 A | 1/2001 |
| JP | 2001-141433 A | 5/2001 |
| JP | 2005-091092 A | 4/2005 |

\* cited by examiner

SENSOR MANUFACTURING METHOD AND SENSOR

CROSS-REFERENCE TO RELATED APPLICATION

This application is a National Stage of PCT international application Ser. No. PCT/JP2016/055720 filed on Feb. 25, 2016, which designates the United States, incorporated herein by reference, and which is based upon and claims the benefit of priority from Japanese Patent Application No. 2015-153453, filed on Aug. 3, 2015, the entire contents of which are incorporated herein by reference.

FIELD

The present invention relates to a sensor manufacturing method and a sensor.

BACKGROUND

As far as configurations of a rotary encoder are concerned, a configuration is known in which a housing of a rotary encoder houses a substrate on which a light emitting device, which emits light, is installed and a substrate on which a light receiving device, which detects the light emitted by the light emitting device, is installed (for example, Patent Literature 1).

CITATION LIST

Patent Literature

Patent Literature 1: Japanese Patent Application Laid-open Publication No. 2001-027551

SUMMARY

Technical Problem

However, in the rotary encoder disclosed in Patent Literature 1, since the light emitting device and the light receiving device are present on different substrates, positioning needs to be performed during the assembly for the purpose of determining the relationship between the area being irradiated by the light emitted from the light emitting device and the area in which the light is received by the light receiving device. In a case where misalignment occurs due to an error in the positioning, there are times when the output of the light receiving device is not the same as the intended output, thereby leading to instability in the output accompanying the detection. Particularly, when a plurality of light receiving devices are used, any misalignment causes variation in the outputs of the light receiving devices, thereby leading to instability in the output accompanying the detection.

The abovementioned issue related to the rotary encoder disclosed in Patent Literature 1 is not limited to rotary encoders in which light is detected, but is common among the sensors in which a generator, which generates the detection target (for example, light), and a detector, which detects the detection target generated by the generator, are installed on separate substrates.

It is an object of an aspect of the present invention to provide a sensor manufacturing method and a sensor for enabling easier positioning of a generator and a detector. Moreover, it is an object of an aspect of the present invention to provide a sensor manufacturing method and a sensor for enabling easier manufacturing.

Solution to Problem

To solve the problems described above, a sensor manufacturing method according to an aspect of the present invention is a sensor manufacturing method for a sensor including a generator that generates a predetermined detection target, a detector that detects the detection target generated by the generator, and a motion body that performs motion in an area in between the generator and the detector. The sensor manufacturing method includes: positioning the generator and the detector opposite to each other by either curving or bending a substrate including a first portion having the generator installed thereon and a second portion having the detector installed thereon that are formed in an integrated manner; and making the substrate and the motion body perform relative movement in such a way that the motion body enters the area in between the generator and the detector.

Thus, since the first portion having the generator installed thereon and the second portion having the detector installed thereon are present in an integrated manner on the substrate, the simple task of bending or curving the substrate enables performing the positioning of the generator and the detector. This makes the positioning of the generator and the detector easier. Moreover, since the positioning can be performed with more ease, the manufacturing process related to the positioning can be simplified. Hence, the manufacturing of the sensor becomes easier. Moreover, since the substrate and the motion body are made to perform relative movement in such a way that the motion body enters the area in between the generator and the detector, it is possible to manufacture a sensor capable of performing sensing related to the movement of the motion body using the generator and the detector installed on the substrate on which the first portion and the second portion are formed in an integrated manner.

In the sensor manufacturing method according to an aspect of the present invention, the substrate includes a joining member that joins the first portion and the second portion, and the substrate and the motion body are made to perform the relative movement in such a way that the motion body enters the area from a side opposite to the joining member.

Thus, the space can be allocated in between the first portion and the second portion using the joining member with more ease. Hence, the target area for detection can be provided in between the generator and the detector with more ease. Furthermore, since the motion body is made to enter the area from the side opposite to the joining member, not only the positioning and the manufacturing becomes easier but the advantage of having the joining member can also be utilized.

In the sensor manufacturing method according to an aspect of the present invention, the first portion and the second portion after curving or bending the substrate are parallel to each other, and a direction of the relative movement of the substrate and the motion body is along the first portion and the second portion.

Thus, the positional relationship between the generator, which is installed on the first portion, and the detector, which is installed on the second portion, can be adjusted based on the relationship between the first portion and the second portion formed to be parallel to each other. For that reason, when the generator has directional characteristics, the positional adjustment for accommodating the detector within the generation area of the detection target generated by the generator becomes easier as well as the design related to the positional angle in installing the generator and the detector on the substrate becomes easier. Moreover, by keeping the direction of relative movement of the substrate and the motion body along the first portion and the second portion, the reference for the direction of relative movement can be determined with more ease and it can be made harder for the substrate and the motion body to come in contact with each other during the relative movement. Hence, the motion body can be made to enter the area with more ease.

In the sensor manufacturing method according to an aspect of the present invention, the motion body is a disk-shaped member that is supported in a rotatable manner via a shaft, and a notch is formed in at least either the first portion or the second portion for ensuring that the shaft and the substrate do not make contact with each other while the motion body remains in the area in between the generator and the detector.

Thus, it becomes possible to prevent the substrate from making contact with the shaft, thus preventing a situation in which the movement of the shaft is hampered.

In the sensor manufacturing method according to an aspect of the present invention, the substrate is mounted on a first member representing one of a plurality of members constituting a housing, and a second member, which represents one of the plurality of members constituting the housing and which supports the motion body, and the first member are brought closer to each other so as to assemble the housing and to make the substrate and the motion body perform relative movement so that the motion body enters the area in between the generator and the detector.

Thus, the motion body can be made to enter the area in between the generator and the detector at the same time during the single process of assembling the housing. Moreover, the adjustment of the positional relationship between the motion body and the rays in between the generator and the detector can also be determined according to the positional relationship between the first member and the second member during the assembly of the housing. Hence, according to the present aspect, the manufacturing becomes easier.

In the sensor manufacturing method according to an aspect of the present invention, after the first member and the second member are assembled, an entrance for the substrate as formed in the second member is covered by a cover member.

Thus, the generator, the detector, and the motion body can be sealed inside the housing. Hence, according to the present embodiment, the sensing related to the motion of the motion body can be performed with more accuracy.

To solve the problems described above, a sensor according to an aspect of the present invention includes A sensor includes: a generator that generates a predetermined detection target; a detector that detects the detection target generated by the generator; a substrate on which the generator and the detecting are installed; a motion body that performs motion in an area in between the generator and the detector; and a housing that houses the generator, the detector, and the motion body. The substrate has a first portion, on which the generator is installed, and a second portion, on which the detector is installed, formed in an integrated manner, has a curved shape or a bent shape in such a way that the generator and the detector are positioned opposite to each other. The housing includes a first member on which the substrate is mounted and includes a second member at which the motion body is installed. The sensor is assembled in such a way that the second member and the first member are relatively moved in a predetermined direction and then abut against each other. The predetermined direction is a direction that allows the motion body to enter the area in between the generator and the detector.

Thus, since the substrate includes the first portion having the generator installed thereon and the second portion having the detector installed thereon that are present in an integrated manner, the simple task of bending or curving the substrate enables performing the positioning of the generator and the detector. Hence, it becomes possible to provide a sensor in which positioning of the generator and the detecting can be performed with more ease. Moreover, since the positioning can be performed with more ease, the manufacturing process related to the positioning can be simplified. Hence, it becomes possible to provide a sensor that can be manufactured with more ease. Furthermore, since the substrate and the motion body are made to perform relative movement in such a way that the motion body enters the area in between the generator and the detector, it becomes possible to manufacture a sensor capable of performing sensing related to the movement of the motion body using the generator and the detector installed on the substrate including the first portion and the second portion that are formed in an integrated manner. Moreover, as a result of using the sensor according to the aspect of the present invention, the motion body can be made to enter the area in between the generator and the detector at the same time during the single process of assembling the housing. Furthermore, as a result of using the sensor according to the aspect of the present invention, the adjustment of the positional relationship between the motion body and the rays in between the generator and the detector can also be determined according to the positional relationship between the first member and the second member during the assembly of the housing. Hence, according to the aspect of the present embodiment, the manufacturing becomes easier.

In the sensor according to an aspect of the present invention, the housing includes a cover member for covering an entrance for the substrate that is present after assembling the first member and the second member.

Thus, the generator, the detector, and the motion body can be sealed inside the housing. Hence, according to the present embodiment, the sensing related to the motion of the motion body can be performed with more accuracy.

Advantageous Effects of Invention

The sensor manufacturing method and the sensor according to an aspect of the present invention facilitate the positioning of the generator and the detector. Moreover, the sensor manufacturing method and the sensor according to an aspect of the present invention facilitate the manufacture of a sensor.

DESCRIPTION OF EMBODIMENTS

An exemplary embodiment of the present invention is described below in detail with reference to the accompanying drawings. However, the present invention is not limited by the description given below in the embodiment. Moreover, the constituent elements mentioned in the following explanation include constituent elements that may easily occur to one skilled in the art and include equivalent constituent elements. Furthermore, the constituent elements described below can be appropriately combined.

Figure 1:
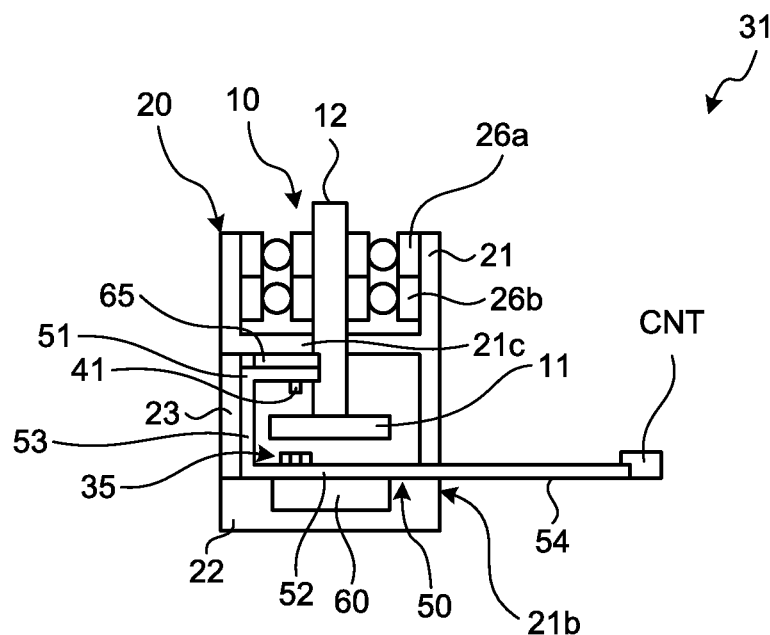
FIG. 1 is a configuration diagram of a sensor according to an embodiment of the present invention.
Figure 2:
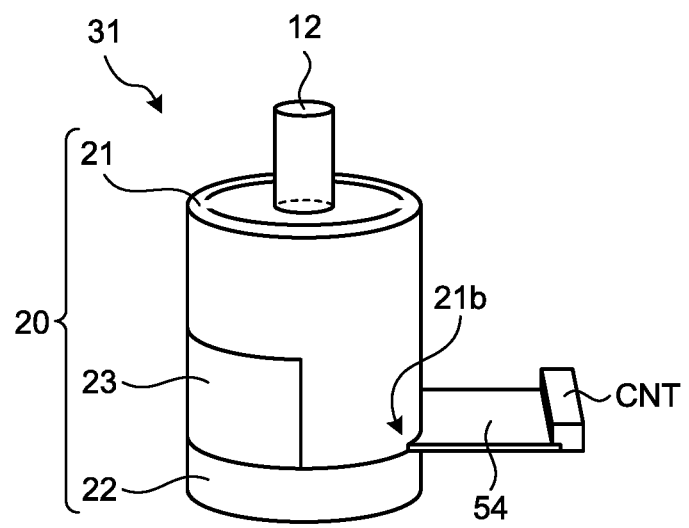
FIG. 2 is an external perspective view of the sensor.
Figure 3:
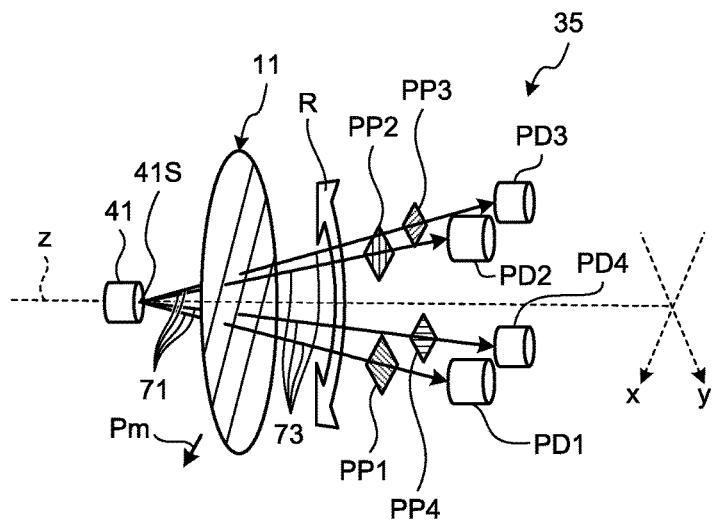
FIG. 3 is an explanatory diagram for explaining an exemplary placement of a generator, an optical scale, and a detector.
Figure 4:
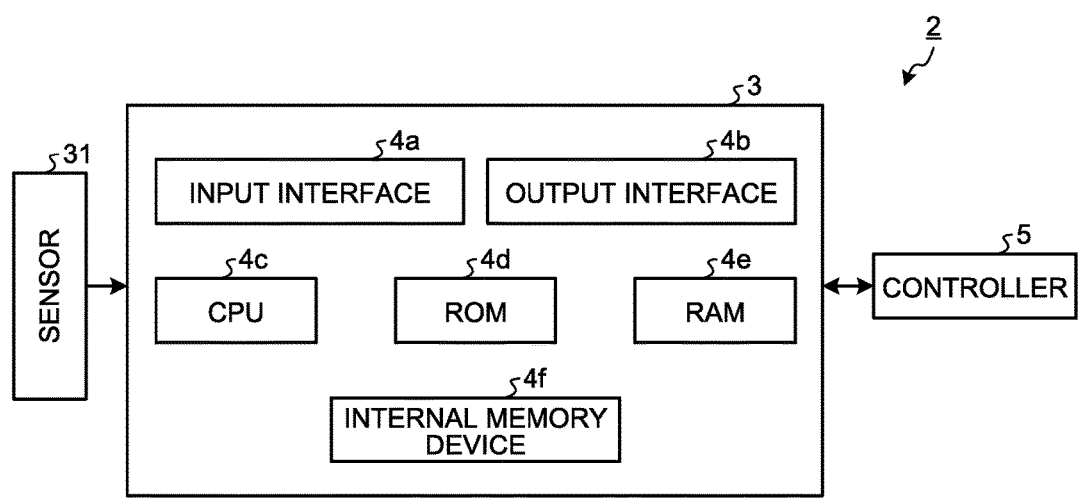
FIG. 4 is a block diagram of an optical encoder.
Figure 5:
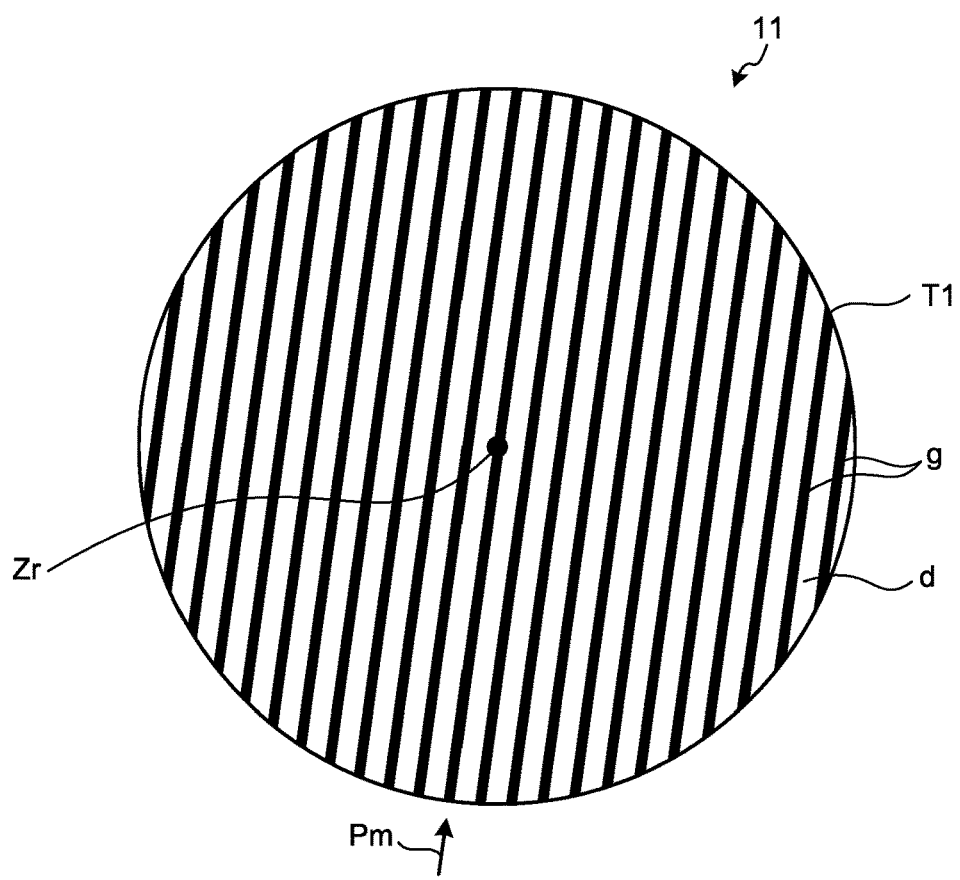
FIG. 5 is an explanatory diagram of an exemplary pattern of the optical scale.

FIG. 1 is a configuration diagram of a sensor 31 according to the embodiment of the present invention. FIG. 2 is an external perspective view of the sensor 31. Thus, FIG. 1 represents a cross-sectional schematic view of FIG. 2. FIG. 3 is an explanatory diagram for explaining an exemplary placement of a generator 41, an optical scale 11, and a detector 35. FIG. 4 is a block diagram of an optical encoder 2. FIG. 5 is an explanatory diagram of an exemplary pattern of the optical scale 11. The sensor 31 includes the generator 41 that generates a detection target represented by electromagnetic waves (for example, light); the detector 35 that detects the detection target generated by the generator 41, across a target area for detection; and a substrate 50 on which the generator 41 and the detector 35 are disposed. In the present embodiment, the sensor 31 further includes a rotor 10 and a stator 20. The rotor 10 includes a shaft 12 coupled with a rotary machine such as a motor, and has a motion body (the optical scale 11) which is attached to an end portion of the shaft 12 and which is disposed in a rotatable manner in the target area for detection. Herein, the target area for detection is the space in between the generator 41 and the detector 35. The generator 41 according to the present embodiment includes a light emitting device that emits light. The detector 35 according to the present embodiment is a light receiving device that receives the light emitted by the generator 41 representing the light emitting device. More particularly, the detector 35 according to the present embodiment includes four light receiving devices, namely, a first light receiver PD1 having a polarization layer PP1, a second light receiver PD2 having a polarization layer PP2, a third light receiver PD3 having a polarization layer PP3, and a fourth light receiving layer having a polarization layer PP4. In FIG. 3, in order to illustrate that incident light 73 representing source light 71, which is emitted from the generator 41, falling on the light receivers (the first light receiver PD1 to the fourth light receiver PD4) passes through the polarization layers PP1 to PP4; the polarization layers PP1 to PP4 are illustrated separately from the first light receiver PD1 to the fourth light receiver PD4, respectively. However, in reality, the polarization layers PP1 to PP4 abut against the first light receiver PD1 to the fourth light receiver PD4, respectively.

Figure 6:
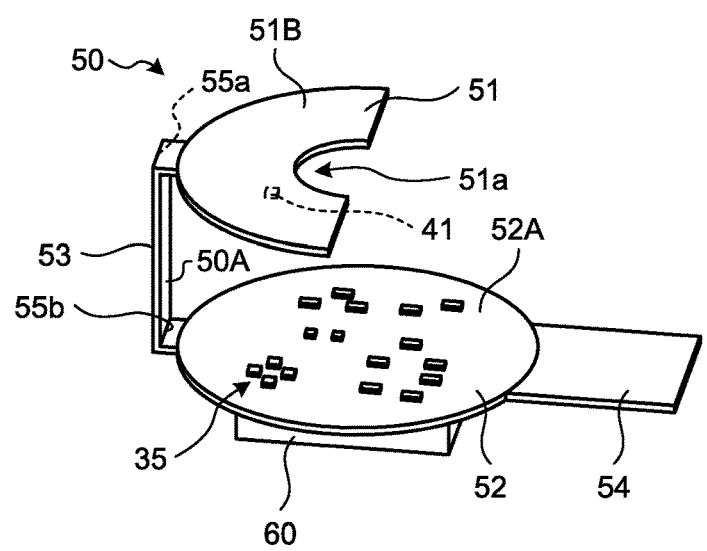
FIG. 6 is a perspective view illustrating an example of a substrate.
Figure 7:
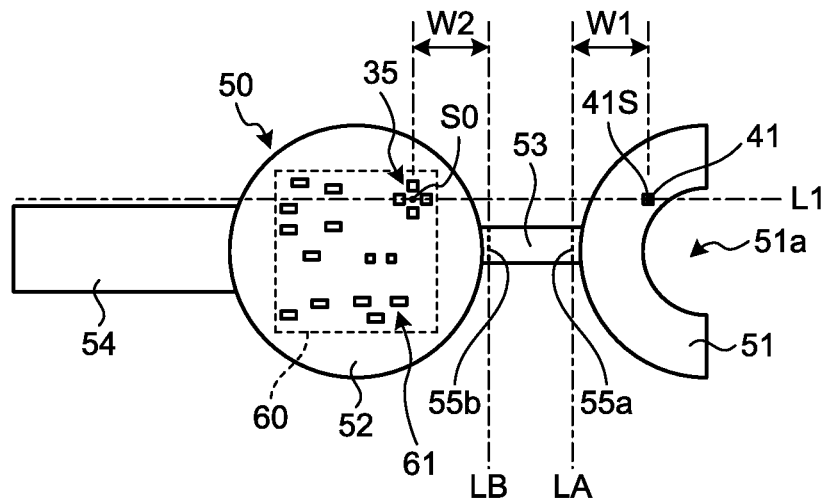
FIG. 7 is a planar view illustrating an example of the substrate before it is bent.
Figure 8:
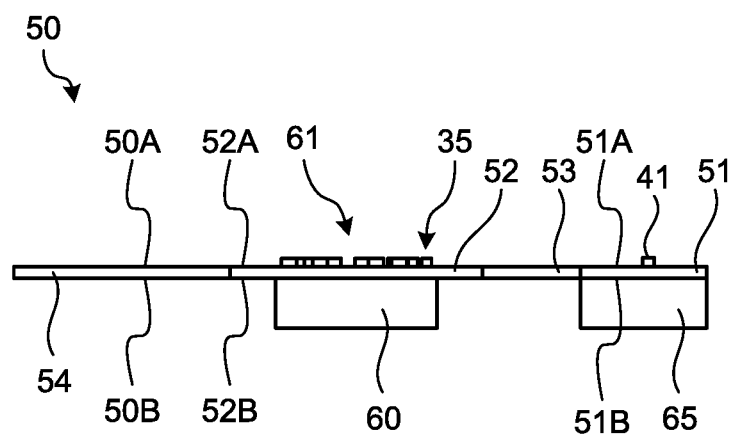
FIG. 8 is a diagram illustrating an exemplary correspondence relationship between the circuit placement on the face on which the generator and the detector are disposed and the configuration provided on the reverse face.
Figure 9:
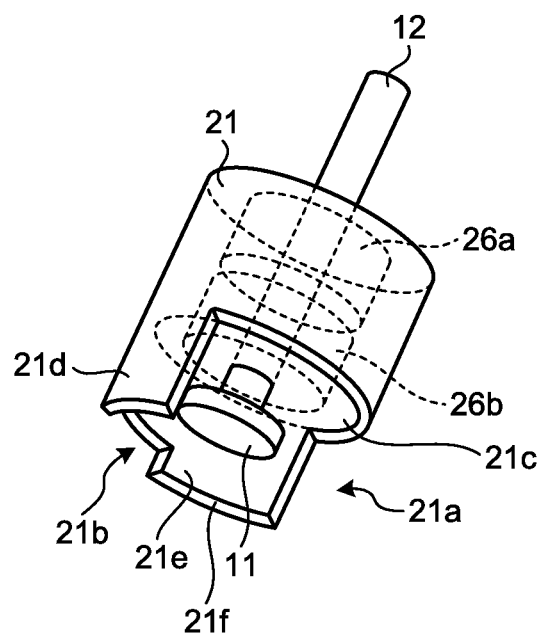
FIG. 9 is a perspective view of a body of a stator and an exemplary configuration disposed on the body.
Figure 10:
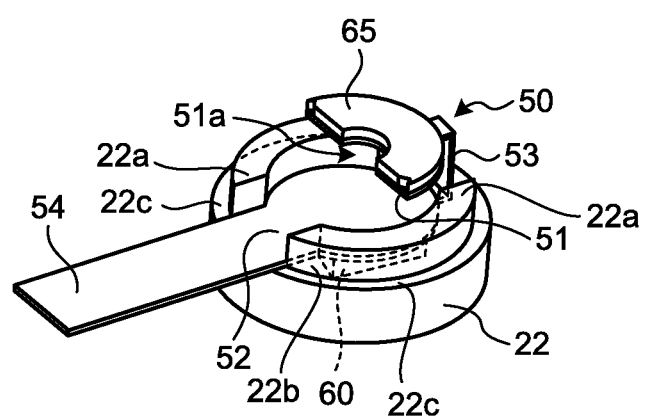
FIG. 10 is a perspective view of an exemplary configuration disposed on an underbody of the stator.
Figure 11:
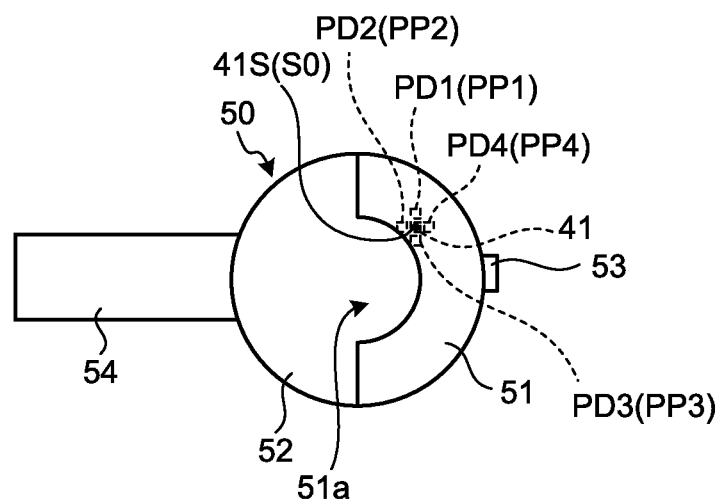
FIG. 11 is a diagram illustrating an exemplary positional relationship between the generator and the detector.
Figure 12:
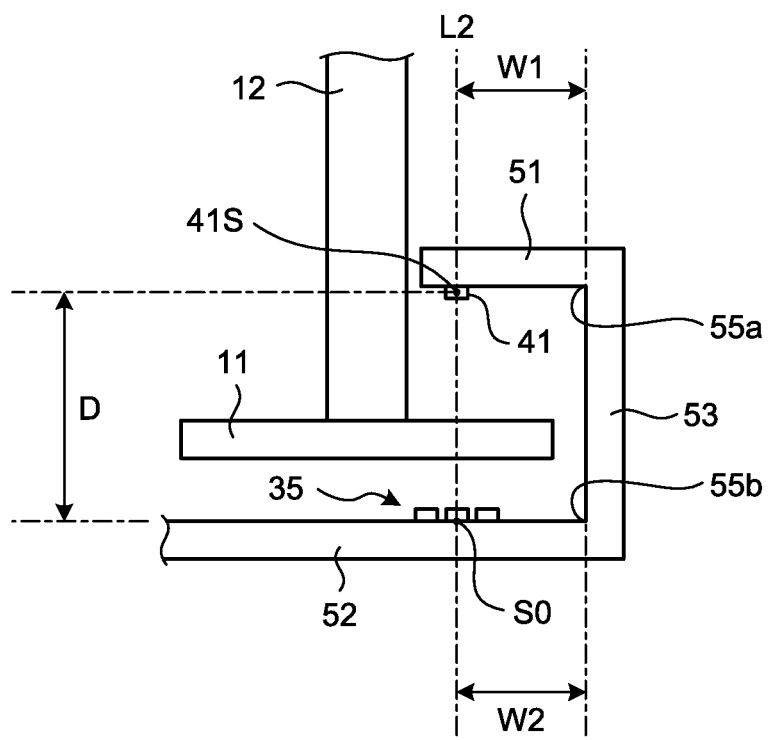
FIG. 12 is a diagram illustrating an exemplary positional relationship between the generator and the detector.
Figure 13:
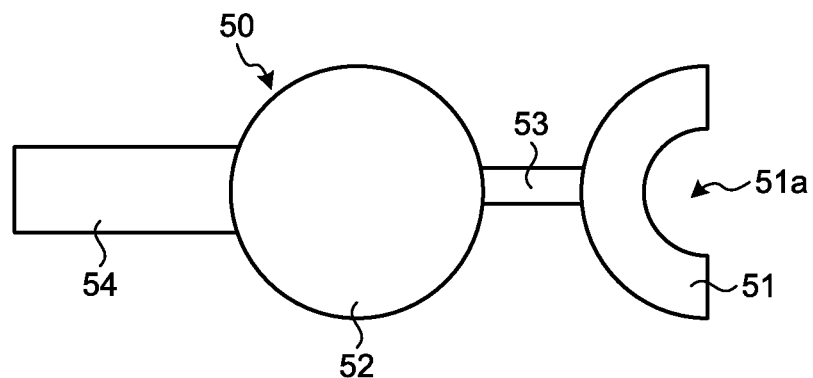
FIG. 13 is a planar view illustrating an exemplary substrate before circuit implementation.
Figure 14:
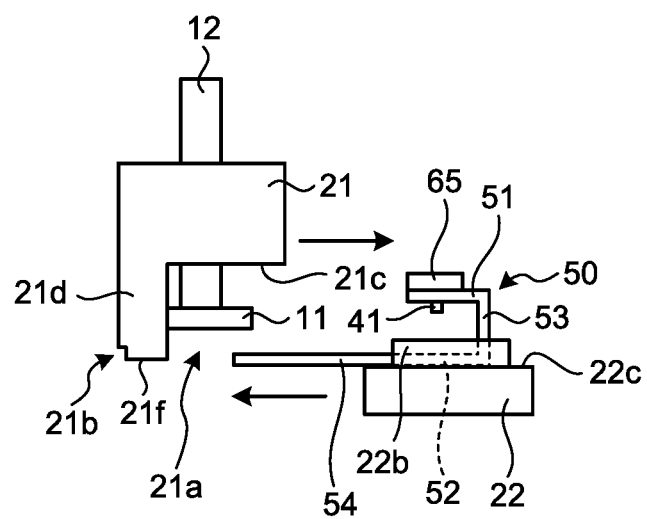
FIG. 14 is a diagram illustrating an exemplary assembly of the stator for the purpose of disposing the optical scale in a target area for detection.
Figure 15:
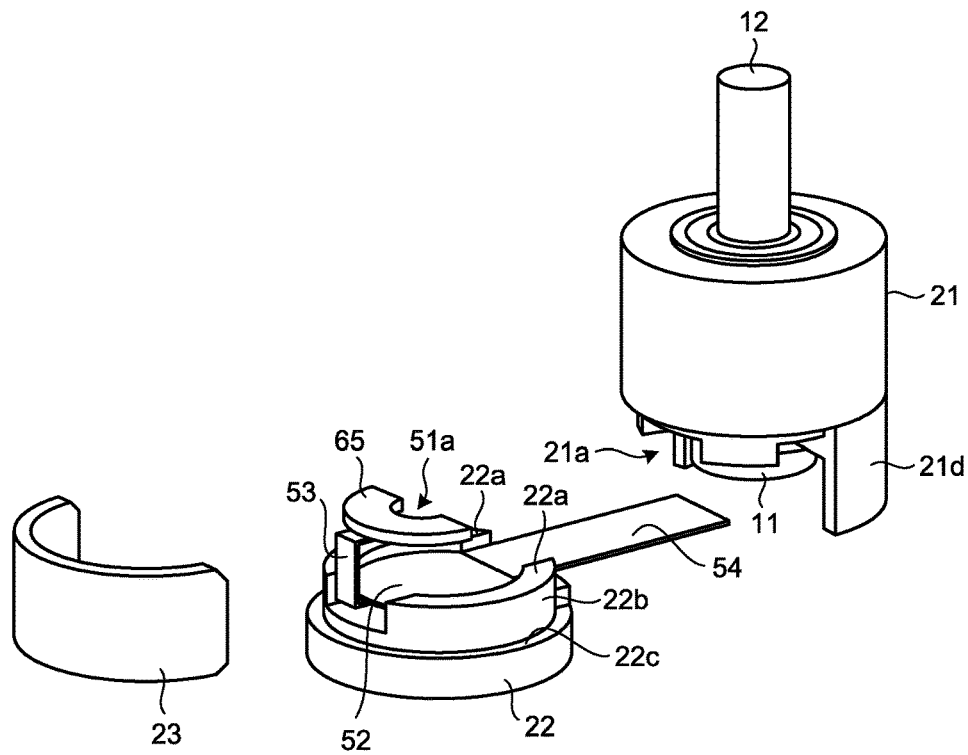
FIG. 15 is a diagram illustrating an exemplary assembly of the stator for the purpose of disposing the optical scale in the target area for detection.
Figure 16:
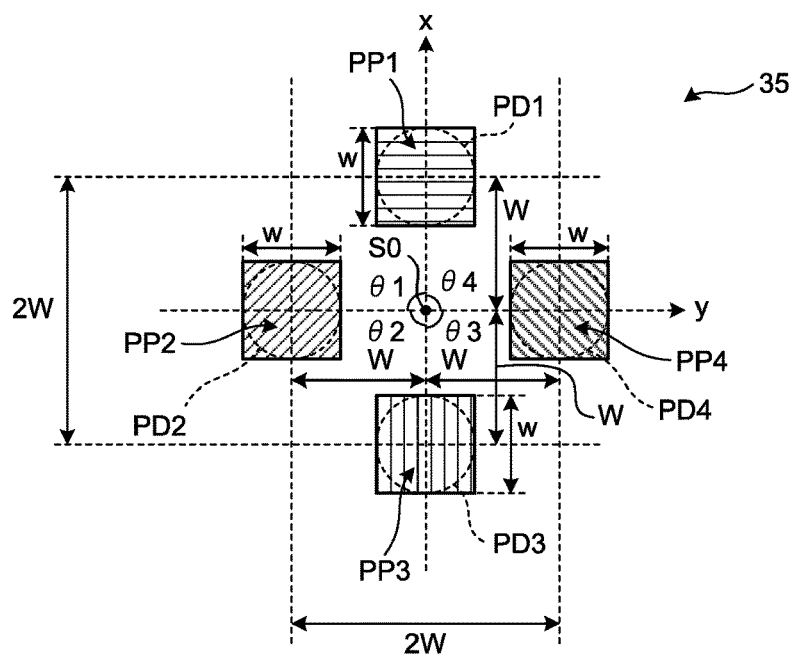
FIG. 16 is an explanatory diagram for explaining an example of the detector.
Figure 22:
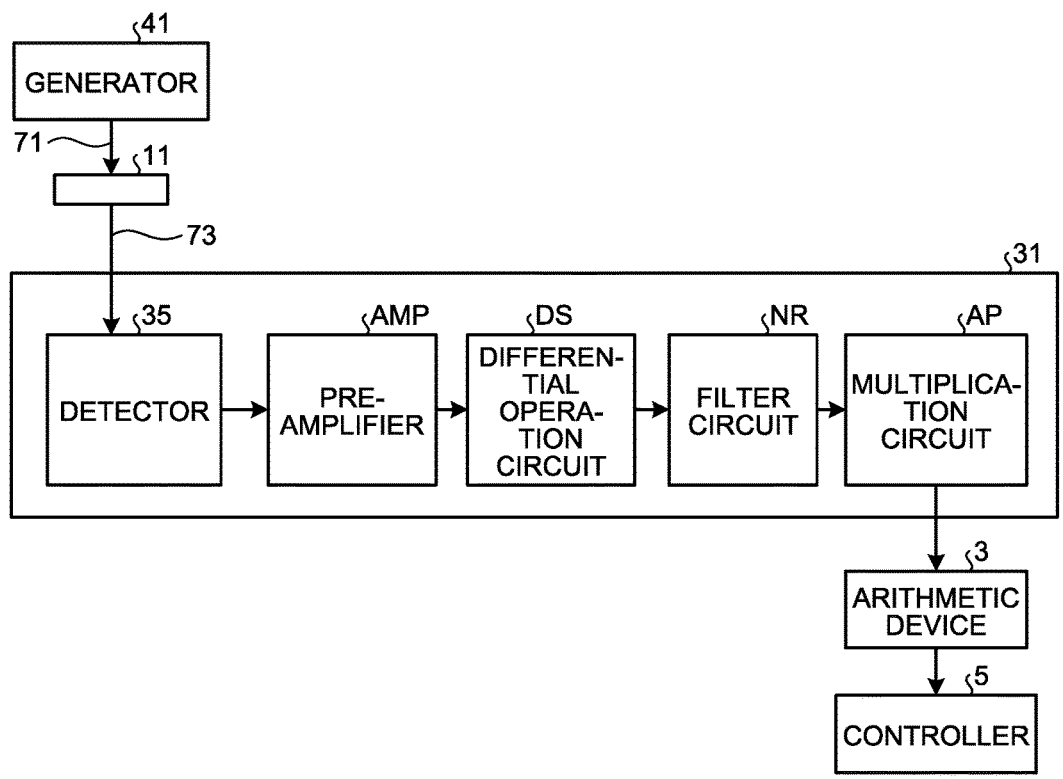
FIG. 22 is a functional block diagram of the optical encoder.

FIG. 6 is a perspective view illustrating an example of the substrate 50. FIG. 7 is a planar view illustrating an example of the substrate 50 before it is bent. FIG. 8 is a diagram illustrating an exemplary correspondence relationship between the circuit placement on the face on which the generator 41 and the detector 35 are disposed and the configuration provided on the reverse face. FIG. 9 is a perspective view of a body 21 of the stator 20 and an exemplary configuration disposed on the body 21. FIG. 10 is a perspective view of an exemplary configuration disposed on an underbody 22 of the stator 20. FIGS. 11 and 12 are diagrams illustrating an exemplary positional relationship between the generator 41 and the detector 35. FIG. 13 is a planar view illustrating an exemplary substrate before circuit implementation. FIGS. 14 and 15 are diagrams illustrating an exemplary assembly of the stator 20 for the purpose of disposing the optical scale 11 in the target area for detection. FIG. 16 is an explanatory diagram for explaining an example of the detector 35. In the substrate 50, a first portion 51 at which the generator 41 is installed is formed in an integrated manner with a second portion 52 at which the detector 35 is installed. For example, as illustrated in FIGS. 6 and 7, the substrate 50 is a single substrate including the semi-arc-like first portion 51 and the circular second portion 52. The substrate 50 is, for example, flexible printed circuits (FPC) and has various circuits (for example, an IC circuit 60 illustrated in FIG. 6) including the generator 41 and the detector 35 mounted thereon. More particularly, the FPC is a flexible interconnection substrate in which, for example, an insulating material such as a polyimide film or a photo-solder resist film serves as a base film; an adhesion layer and a conductor layer are formed on the base film; and portions excluding terminals (including soldered portions) among portions in the conductor layer are covered by an insulating material. The conductor layer is an electrical conductor made of copper, and signal lines and power lines that are connected to components such as various circuits are provided on the conductor layer according to patterns thereof. However, a specific configuration of a flexible substrate that can be employed for the present invention is not limited to the example given above, and can be modified as needed. Except for the detector 35 and the generator 41, various circuits such as the IC circuit 60 constitute, for example, a pre-amplifier AMP, a differential operation circuit DS, a filter circuit NR, and a multiplication circuit AP that are illustrated in FIG. 22 described later. In the following explanation, a face of the substrate 50 on which the generator 41 and the detector 35 are disposed is referred to as a top face 50A, and a face on the opposite side thereof is referred to as a reverse face 50B (see FIG. 8). Moreover, of the top face 50A of the substrate 50, a top face 51A of the first portion 51 and a top face 52A of the second portion 52 are distinguished from each other. Furthermore, of the reverse face 50B of the substrate 50, a reverse face 51B of the first portion 51 and a reverse face 52B of the second portion 52 are distinguished from each other.

In the substrate 50, a tabular supporting member is attached to the reverse face of at least one of the face of the first portion 51 on which electronic components including the generator 41 are disposed and the face of the second portion 52 on which electronic components including the detector 35 are disposed. The tabular supporting member maintains the face, on which electronic components are disposed, in a plane. More particularly, for example, as illustrated in FIG. 7, apart from the photodiodes (the first light receiver PD1 to the fourth receiver PD4) included in the light receiving devices, components 61 on the face (i.e., the top face 52A) of the second portion 52 on which the light receiving device is disposed are arranged within the mounting area of the IC circuit 60 on the reverse face 52B. The components 61 represent other circuits disposed on the face (i.e., the top face 52A) of the second portion 52 on which the light receiving devices are disposed. More particularly, the components 61 include circuit components such as an IC chip, a resistor, and a capacitor. The IC circuit 60 is an integrated circuit in which, for example, a package of the Quad flat no lead package (QFN) type is employed. Thus, according to the present embodiment, the supporting member of the second portion 52 is a package of the integrated circuit (the IC circuit 60). One or more electronic components (such as the detector 35 and the components 61), which are disposed on the second portion 52 having the package mounted thereon, are disposed on the reverse side at the position of the package across the substrate 50. The type of the package of the integrated circuit is not limited to the QFN type. That is, any supporting structure can be used that is capable of functioning as a supporting member for maintaining, in a plane, the face (for example, the top face 52A of the second portion 52) opposite to the face on which the integrated circuit is disposed. In the present embodiment, the components 61 such as the other circuits including an IC chip, a resistor, and a capacitor that are disposed on the top face 52A of the second portion 52 include a package circuit that is connected to the wiring using soldering and a bare chip that is connected to the wiring using wire bonding. However, that is only exemplary, and the configuration is not limited to that. That is, either the package circuit or the bare chip can be used, or some or all circuits may employ other package types.

As illustrated in FIG. 8, a support substrate 65 is disposed on the reverse side of the face of the first portion 51 according to the present embodiment on which a light emitting device having a light emitting device 41U packaged therein (see FIG. 25) is disposed. The support substrate 65 is a tabular member having a semi-arc-like shape and, for example, corresponds to the semi-arc-like shape of the first portion 51. More particularly, suppose that a torus-shaped (arc-like) board surface, in which a circular hole having a diameter smaller than the diameter of the circular board is formed in the center of the circular board, is divided into two portions along the diameter. In this case, the first portion 51 and the support substrate 65 have a semi-arc-like board surface corresponding to one of the two divided portions. The support substrate 65 is made of, for example, a resin having insulation properties. Thus, the supporting member of the first portion 51 in the present embodiment is a tabular member having insulation properties and is shaped in conformance with the shape of the first portion 51. The support substrate 65 according to the present embodiment is only an example of the supporting member that is not a circuit. However, the supporting member is not limited to the support substrate 65 and can be appropriately changed.

The substrate 50 has a joining member 53 for joining the first portion 51 and the second portion 52. More particularly, for example, as illustrated in FIGS. 6 and 7, the joining member 53 is provided between the first portion 51 and the second portion 52, and joins the outer periphery of the arc of the first portion 51 and the outer periphery of the arc of the second portion 52.

The joining member 53 includes the wiring that is to be connected to the generator 41 (or the detector 35). In the present embodiment, the joining member 53 includes signal lines and power lines that are connected to the generator 41. More particularly, the wiring of the joining member 53 is provided as, for example, signal lines and power lines implemented in an FPC. Although there is no circuit installed in the joining member 53 according to the present embodiment, it is also possible to install components such as a circuit in the joining member 53.

As illustrated in FIGS. 6 and 7, the joining member 53 according to the present embodiment has a smaller width in a direction that is orthogonal to an extending direction of the joining member 53 between the first portion 51 and the second portion 52 and that is along the board surface of the substrate 50, than those of the first portion 51 and the second portion 52.

The substrate 50 includes a harness portion 54 that includes the wiring to be connected to the generator 41 and the detector 35. More particularly, for example, as illustrated in FIGS. 6 and 7, the harness portion 54 is disposed to extend from the first portion 51 and on the side opposite to the joining member 53. The harness portion 54 includes signal lines and power lines to be connected to various circuits installed in the generator 41, the detector 35, and the substrate 50. More particularly, the wiring in the harness portion 54 is provided as, for example, signal lines and power lines implemented in an FPC. In the present embodiment, the wiring of the generator 41 is provided at the first portion 51, the joining member 53, and the harness portion 54. Moreover, the wiring of the detector 35 is provided at the second portion 52 and the harness portion 54.

For example, as illustrated in FIG. 1, the harness portion 54 may be connected to a connector CNT. Herein, the connector CNT is an interface for connecting the sensor 31 to other devices (for example, an arithmetic device 3). Thus, the sensor 31 is connected to the arithmetic device 3 via the connector CNT. That is, the harness portion 54 functions as the wiring for connecting various circuits installed on the substrate 50 with other devices (for example, the arithmetic device 3). The harness portion 54 may also have components such as circuits installed therein. The connector CNT may be omitted. In that case, the leading end of the harness portion 54 is provided as, for example, a terminal that is inserted in the connector (not illustrated) provided in the device to which the sensor 31 is to be connected.

The substrate 50 is disposed in such a way that the first portion 51 and the second portion 52 are parallel to each other. More particularly, as illustrated in FIGS. 1 and 6, the substrate 50 is bent in such a shape (the C-shape) that the generator 41 and the detector 35 are positioned opposite to each other. In the present embodiment, at two bending positions 55a and 55b provided in the joining member 53, the substrate 50 is bent at right angles so that the top face 50A faces the inside. That is, the substrate 50 is bent in such a way that each of the first portion 51 and the second portion 52 makes a right angle with respect to the joining member 53, and that the first portion 51 and the second portion 52 are positioned opposite to each other. With that, the first portion 51 and the second portion 52 are parallel to each other, and the generator 41 and the detector 35 are positioned opposite to each other. In the present embodiment, of the two bending positions 55a and 55b, the bending position closer to the first portion 51 is referred to as the bending position 55a, and the bending position closer to the second portion 52 is referred to as the bending position 55b.

The face of the first portion 51 on which the generator 41 is installed and the face of the second portion 52 on which the detector 35 is installed are on the same face of the substrate 50 (i.e., the top face 50A). When the face on which the generator 41 is installed is positioned opposite to the face on which the detector 35 is disposed, the positional relationship between the generator 41 and the detector 35 becomes such that the detection target (for example, light) generated by the generator 41 is detectable by the detector 35 as illustrated in FIG. 3 and other figures. Moreover, the space in between the generator 41 and the detector 35, which are positioned opposite to each other, corresponds to the target area for detection.

In this way, in the substrate 50, the first portion 51 on which the generator 41 is disposed, the second portion 52 on which the detector 35 is disposed, and the joining member 53 that joins the first portion 51 and the second portion 52 are formed in an integrated manner; and the face (i.e., the top face 51A) of the first portion 51 on which the generator 41 is installed and the face (i.e., the top face 52A) of the second portion 52 on which the detector 35 is installed are positioned parallel and opposite to each other by bending the substrate 50 in right angles at the two bending positions 55a and 55b. As illustrated in FIG. 7, a first axis LA representing the bending axis at the bending position 55a and a second axis LB representing the bending axis at the bending position 55b are parallel to each other. Herein, a bending axis corresponds to a central axis for the rotary motion of one portion (for example, the joining member 53) with respect to the other portion (for example, the first portion 51 or the second portion 52) that is opposite across the bending position (for example, the bending position 55a or the bending position 55b) in bending the substrate 50. In the present embodiment, the first axis LA and the second axis LB are respectively present at positions that overlap with two bending lines formed as fold lines at the bending positions 55a and 55b in the substrate 50.

Moreover, the distance between a first point and the first axis LA is equal to the distance between a second point and the second axis LB, the first point being the central point of generation of the detection target generated by the generator 41 in the plane prior to the bending of the substrate 50, and the second point being either the center of the detection area in which the detection target is detected by the detector 35 or the placement center of a plurality of detection areas of the detector 35. More particularly, as illustrated in FIG. 7, a distance W1 between a light emission point 41S of the generator 41 according to the present embodiment and the bending line at the bending position 55a serving as the first axis LA is equal to a distance W2 between a placement center S0 of the four light receiving devices including the first light receiver PD1, the second light receiver PD2, the third light receiving device PD2, and the fourth light receiving device PD4 of the detector 35 and the bending line at the bending position 55b serving as the second axis LB. Herein, the light emission point 41S of the generator 41 represents the first point according to the present embodiment, and the placement center S0 represents the second point according to the present embodiment.

The first point and the second point are present on the same straight line along the substrate 50 prior to the bending thereof, and that straight line intersects with the first axis LA and the second axis LB at right angles. Thus, the first point and the second point are present on the same straight line orthogonal to the first axis LA and the second axis LB. More particularly, as illustrated in FIG. 7, the light emission point 41S of the generator 41 and the placement center S0 are present on a straight line L1 that is orthogonal to the two bending lines at the bending positions 55a and 55b, that is, orthogonal to the first axis LA and the second axis LB.

The four light receiving devices are displayed at different positions in a predetermined plane. The distance to a single point in the predetermined plane is equal from each of the four light receiving devices. The four line segments connecting the single point to the respective centers of the light receiving areas of the four light receiving devices are at right angles with each other. More particularly, the four light receiving devices, namely, the first light receiver PD1, the second light receiver PD2, the third light receiver PD3, and the fourth light receiver PD4 of the detector 35 are placed equidistantly from a single point (the placement center S0) on the top face 52A of the second portion 52 of the substrate 50. Moreover, on the top face 52A, the first light receiver PD1 and the third light receiver PD3 are placed at point-symmetric positions across the placement center S0, and the second light receiver PD2 and the fourth light receiver PD4 are placed at point-symmetric positions across the placement center S0. Moreover, in the present embodiment, the light receiving areas of the first light receiver PD1, the second light receiver PD2, the third light receiver PD3, and the fourth light receiver PD4 are identical in shape and dimensions. Furthermore, in the detector 35, the center of the light receiving area of the first light receiver PD1 and the center of the light receiving area of the third light receiver PD3 are placed at a distance of 2 W with the placement center S0 serving as the midpoint; and the center of the light receiving area of the second light receiver PD2 and the center of the light receiving area of the fourth light receiver PD4 are placed at a distance of 2 W with the placement center S0 serving as the midpoint. In other words, the center of the light receiving area of each of the four light receiving devices including the first light receiver PD1 to the fourth light receiver PD4 has the identical distance W to the placement center S0. In the present embodiment, the distance W from the center of the light receiving area of each of the first light receiver PD1, the second light receiver PD2, the third light receiver PD3, and the fourth light receiver PD4 to the placement center S0 is greater than a width w of the first light receiver PD1, the second light receiver PD2, the third light receiver PD3, and the fourth light receiver PD4. If the x-axis is represented by a virtual axis passing through the center of the light receiving area of the first light receiver PD1, the placement center S0, and the center of the light receiving area of the third light receiver PD3 and if the y-axis is represented by a virtual axis passing through the center of the light receiving area of the second light receiver PD2, the placement center S0, and the center of the light receiving area of the fourth light receiver PD4; then the x-axis and the y-axis are orthogonal to each other on the top face 52A of the second portion 52. That is, on the top face 52A of the second portion 52, the center of the light receiving area of the first light receiver PD1 and the center of the light receiving area of the second light receiver PD2 form an angle θ1 equal to 90° therebetween. Similarly, the center of the light receiving area of the second light receiver PD2 and the center of the light receiving area of the third light receiver PD3 form an angle θ2 equal to 90° therebetween; the center of the light receiving area of the third light receiver PD3 and the center of the light receiving area of the fourth light receiver PD4 form an angle θ3 equal to 90° therebetween; and the center of the light receiving area of the fourth light receiver PD4 and the center of the light receiving area of the first light receiver PD1 form an angle θ4 equal to 90° therebetween. In this way, the first light receiver PD1, the second light receiver PD2, the third light receiver PD3, and the fourth light receiver PD4 are placed in a concyclic manner at 90° from each other on the top face 52A around the placement center S0 serving as the center of the circle. Moreover, the x-y plane including the x-axis and the y-axis is orthogonal to a z-axis that connects the light emission point 41S of the generator 41 and the placement center S0. That is, when the top face 52A is looked down along the z-axis direction from the generator 41, the light emission point 41S overlaps with the placement center S0. That is, a straight line L2 (see FIG. 12), which represents the normal of a predetermined plane (for example, the top face 52A of the second portion 52) passing through a single point (the placement center S0), passes through the center of the light emission point 41S of the generator 41. Thus, the first light receiver PD1, the second light receiver PD2, the third light receiver PD3, and the fourth light receiver PD4 are equidistantly placed from the light emission point 41S of the generator 41.

The detector 35 detects the changes in the detection target (for example, the electromagnetic waves of light) that are attributed to the changes in the physical quantity in the target area for detection. The changes in the physical quantity are attributed to, for example, the rotation of the motion body in the target area for detection. More particularly, for example, as illustrated in FIGS. 1 to 3, the optical scale 11 of the rotor 10 is installed in the target area for detection. The sensor 31 performs output according to the changes in the detection result of the detection target that are attributed to the rotation of the optical scale 11 representing the motion body. That is, the sensor 31 functions as a rotary encoder that detects the angular position of the rotary motion body which is connected to the rotor 10 for transmitting the rotary motion.

One of the first portion 51 and the second portion 52 is smaller than the other thereof. More particularly, for example, as illustrated in FIGS. 6 and 7, the arc-like first portion 51 of the present embodiment has a diameter substantially identical to the diameter of the circular second portion 52. The first portion 51 has a semi-arc-like shape in which a semicircular notch 51a is formed in the inner periphery of the semicircular FPC. For that reason, the area occupied by the first portion 51 in the substrate 50 is smaller than the area occupied by the second portion 52. The notch 51a is formed to ensure that the shaft 12 and the substrate 50 do not make contact with each other.

The rotor 10 includes the optical scale 11 that is discoid as illustrated in FIG. 5 (or is polygonal). The optical scale 11 is made of, for example, silicon, glass, or a high-polymer material. The optical scale 11 illustrated in FIG. 5 has a signal track T1 formed on one of the board surfaces. Moreover, in the rotor 10, the shaft 12 is mounted on the other board surface other than the board surface on which the optical scale 11 is mounted. The optical scale 11 may have a gradient. In this case, if the angle of the gradient is small, there is no impact on the function of polarization separation. The optical scale 11 according to the present embodiment functions as a member that performs motion in the target area for detection present in between the generator 41 and the detector 35 and exerts influence on the light. Although the optical scale 11 that represents the motion body according to the present embodiment is a discoid member supported in a rotatable manner via a shaft, it is only exemplary and the shape or the like thereof can be modified appropriately.

The stator 20 is made of a light blocking member and circumscribes bearings 26a and 26b, the shaft 12, the optical scale 11 that is mounted at an end portion of the shaft 12, and the detector 35. Hence, inside the stator 20, the optical noise from outside can be held down. The stator 20 according to the present embodiment functions as a housing for the substrate 50 and the member (the optical scale 11). The housing includes a first member having some portion of the substrate 50 fixed thereto, and a second member that supports the member in a movable manner. More particularly, the stator 20 includes the body 21 functioning as the second member, the underbody 22 functioning as the first member, and a cover 23. The body 21 is a housing that supports the shaft 12 in a rotatable manner via the bearings 26a and 26b. The inner periphery of the body 21 is fixed to the outer rings of the bearings 26a and 26b, and the outer periphery of the body 21 is fixed to the inner rings of the bearings 26a and 26b. When the shaft 12 rotates due to the rotations transmitted from a rotary machine such as a motor, the optical scale 11 rotates in tandem with the shaft 12 around a rotation center Zr serving as the axis center. The body 21 has an opening 21a that is used in fitting the underbody 22, which is disposed on the substrate 50, to the body 21. To the underbody 22, the substrate 50 is fixed in such a way that, of the second portion 52 of the substrate 50, at least some portion of the face on the side opposite to the side on which the detector 35 is installed (i.e., some portion of the reverse face) abuts against the underbody 22. More particularly, as described above, on the reverse face 50B of the substrate 50, the IC circuit 60 is disposed as a component included in the sensor 31. For example, as illustrated in FIG. 10, the underbody 22 has such a shape that it covers the IC circuit 60 on the reverse face from outside and abuts against the circular outer periphery of the second portion 52. The joining member 53 of the substrate 50 that is bent in the C-shape is fixed to the underbody 22 and is thus positioned to stand erected from the second portion 52. In this way, the second portion 52 is fixed to the underbody 22, and thus the substrate 50 in the present embodiment is fixed to the underbody 22. The cover 23 constitutes a part of the cylindrical outer periphery of the stator 20. The cover 23 is disposed on the opening 21a side of the body 21, that is, on the side opposite to a notch 21b at which the harness portion 54 extends from the underbody 22. When the cover 23 is assembled to an assembly obtained by assembling the body 21 and the underbody 22 to cover the opening 21a; the body 21, the underbody 22, and the cover 23 form the cylindrical stator 20 and block the external optical noise from entering the inside of the stator 20. In this way, the underbody 22 and the cover 23 function as the lid of the body 21 that serves as the housing.

The face of the first portion 51 on the side opposite to the target area for detection is bonded to the second member (for example, the body 21). More particularly, the face of the first portion 51 on the side opposite to the target area for detection (i.e., the reverse face 51B) is bonded to the second member via a tabular member (for example, the support substrate 65). More particularly, in the support substrate 65 according to the present embodiment, an adhesive tape is applied on the face abutting against the first portion 51 as well as applied on the opposite face. This tape is what is called a double-faced adhesive tape. Thus, one face of the support substrate 65 is bonded to the face (i.e., the reverse face 51B) on the reverse side of the first portion 51 via the tape. Moreover, while one face of the support substrate 65 remains bonded to the first portion 51, the other face has adhesive property. That other face is bonded to the face of the body 21 where the shaft 12 is extending from the body 21, and that faces the underbody 22 (in the following explanation, referred to as a bonding face 21c) via the tape. Thus, one of the first portion 51 and the second portion 52 (in the present embodiment, the second portion 52) is fixed to the first member (the underbody 22). The face of the other portion (in the present embodiment, the first portion 51) on the opposite to the target area for detection is bonded to the body 21. Moreover, while one face of the tabular member (for example, the support substrate 65) remains bonded to the face (i.e., to the reverse face 51B) of the other portion on the side opposite to the target area for detection, the other face is bonded to the body 21. The tabular member (for example, the support substrate 65) between the second member (for example, the body 21) and the face (for example, the reverse face 51B) of the other (for example, the first portion 51) of the first portion 51 and the second portion 52 on the side opposite to the target area for detection, desirably has more rigidity than the substrate 50.

In the present embodiment, the face of the first portion 51 on the side opposite to the target area for detection is bonded to the second member via the support substrate 65. However, that is only one specific example of the bonding, and the bonding is not limited to that example. Alternatively, for example, the reverse face 51B of the first portion 51 can be bonded to the bonding face 21c using an adhesive agent or a tape (such as a double-faced adhesive tape). More particularly, for example, dots of an adhesive agent may be applied at a plurality of points near the outer periphery or at a plurality of points on the inner periphery of the support substrate 65, and then the support substrate 65 and the reverse face 51B of the first portion 51 may be spot-fixed and the support substrate 65 and the bonding face 21c may be spot-fixed. Moreover, as the reinforcement used until the solidification of the adhesive agent, another tape may also be used together in the spot-fixation.

In the case of using an adhesive agent too, the adhesive agent can be applied to the second member (for example, the body 21) or to the face of the other portion of the first portion 51 and the second portion 52, the face being on the side opposite to the target area for detection; and just by abutting the second member against the other portion, the face of the other portion on the side opposite to the target area for detection can be bonded to the second member. Hence, it becomes easier to assemble the sensor 31.

As illustrated in FIG. 3, when the shaft 12 of the rotor 10 rotates, the optical scale 11 perform relative movement with respect to the detector 35 in, for example, an R direction. As a result, the signal track T1 of the optical scale 11 performs relative movement with respect to the detector 35. In the optical scale 11, a polarization direction Pm of the polarizers in the plane is toward a predetermined direction and changes due to the rotation. The detector 35 can receive the incident light (transmitted light) 73 obtained as a result of passage of the source light 71, which is emitted from the generator 41, through the optical scale 11, and can read the signal track T1 of the optical scale 11 illustrated in FIG. 5.

The optical encoder 2 includes the sensor 31 and the arithmetic device 3. As illustrated in FIG. 4, the sensor 31 and the arithmetic device 3 are connected to each other. The arithmetic device 3 is connected to, for example, a controller 5 of the rotary machine such as a motor.

The optical encoder 2 detects the incident light 73 with the detector 35, the incident light 73 corresponding to the source light 71 having passed through the optical scale 11 and incident on the detector 35. The arithmetic device 3 computes the relative position of the rotor 10 of the sensor 31 with respect to the detector 35 based on the detection signal of the detector 35, and outputs the information about the relative position as a control signal to the controller 5 of the rotary machine such as a motor.

The arithmetic device 3 is a computer such as a personal computer (PC) and includes an input interface 4a, an output interface 4b, a Central Processing Unit (CPU) 4c, a Read Only Memory (ROM) 4d, a Random Access Memory (RAM) 4e, and an internal memory device 4f. The input interface 4a, the output interface 4b, the CPU 4c, the ROM 4d, the RAM 4e, and the internal memory device 4f are connected to each other by an internal bus. The arithmetic device 3 may alternatively be configured using a dedicated processing circuit.

The input interface 4a receives an input signal from the detector 35 of the sensor 31, and outputs the input signal to the CPU 4c. The output interface 4b receives a control signal from the CPU 4c, and outputs the control signal to the controller 5.

The ROM 4d stores programs such as the BIOS (Basic Input Output System). The internal memory device 4f is, for example, an HDD (Hard Disk Drive) or a flash memory, and stores an operating system program or an application program. The CPU 4c uses the RAM 4e as the work area and executes the programs stored in the ROM 4d or the internal memory device 4f so as to implement various functions.

The internal memory device 4f stores a database in which the polarization direction Pm due to the optical scale 11 is held in a corresponding manner to the output of the detector 35. Further, the internal memory device 4f stores a database in which the distance D (see FIG. 12) between the light emission point 41S of the generator 41 and the placement center S0 (the detector 35) is held in a corresponding manner to the position information of the optical scale 11.

The signal track T1 illustrated in FIG. 5 is obtained by forming an arrangement of metallic thin wires g called a wire grid pattern on the optical scale 11 illustrated in FIG. 1. On the optical scale 11, neighboring metallic thin wires g are linearly formed parallel to each other, which function as the signal track T1. Hence, the optical scale 11 has the same polarizing axis regardless of the position irradiated by the source light 71, and the polarization direction of the polarizers in the plane is toward a single direction.

The optical scale 11, which includes the metallic thin wires g called a wire grid pattern, enables achieving enhancement in the heat resistance as compared to a light-induced polarization plate. Moreover, the optical scale 11 has, locally too, line patterns not having any intersecting portions. Thus, the optical scale 11 achieves high accuracy with fewer errors. Furthermore, since the optical scale 11 can also be manufactured in a stable manner using one-shot exposure or the nanoimprint technology. Thus, the optical scale 11 achieves high accuracy with fewer errors. A light-induced polarization plate may alternatively be used as the optical scale 11.

A plurality of metallic thin wires g are arranged without any intersection therebetween. The area between neighboring thin metallic wires g is a transmission area d through which part of the source light 71 or the entire source light 71 can pass. When the width of the metallic thin wires g and the gap between neighboring metallic thin wires g, that is, the width of the metallic thin wires g and the width of the transmission areas d are set to be sufficiently smaller than the wavelength of the source light 71 from the generator 41; the optical scale 11 becomes able to perform polarization separation of the incident light 73 of the source light 71. For that reason, the optical scale 11 includes polarizers having a uniform polarization direction Pm in the plane. In the rotating circumferential direction, the polarizing axis of the incident light 73, which is incident on the detector 35, changes according to the rotation of the optical scale 11. In the present embodiment, the change in the polarizing axis increases or decreases twice with respect to a single rotation of the optical scale 11.

In the optical scale 11, the segments having different polarization directions need not be fine. Moreover, since the optical scale 11 has a uniform polarization direction Pm, there are no boundaries of areas having different polarization directions Pm, and thus it becomes possible to hold down the disturbance in the polarized state of the incident light 73 attributed to the boundaries. The optical encoder 2 according to the present embodiment enables achieving reduction in erroneous detection and achieving reduction in the possibility of occurrence of noise.

Figure 17:
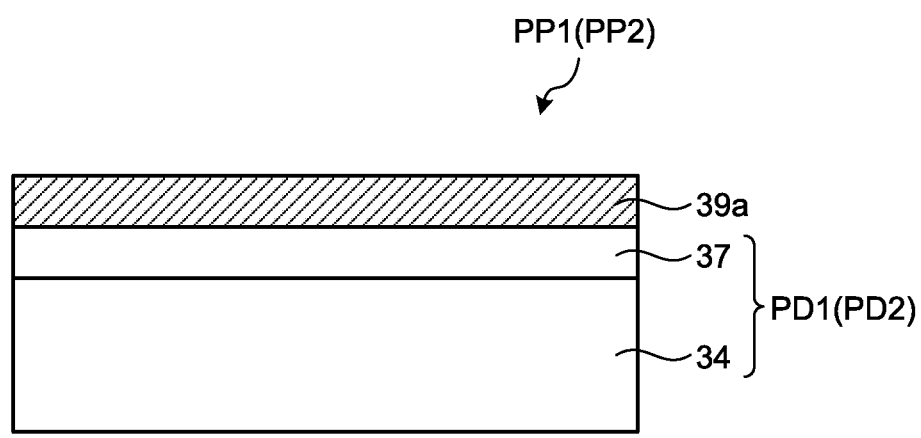
FIG. 17 is an explanatory diagram for explaining an example of a first light receiver of the detector.
Figure 18:
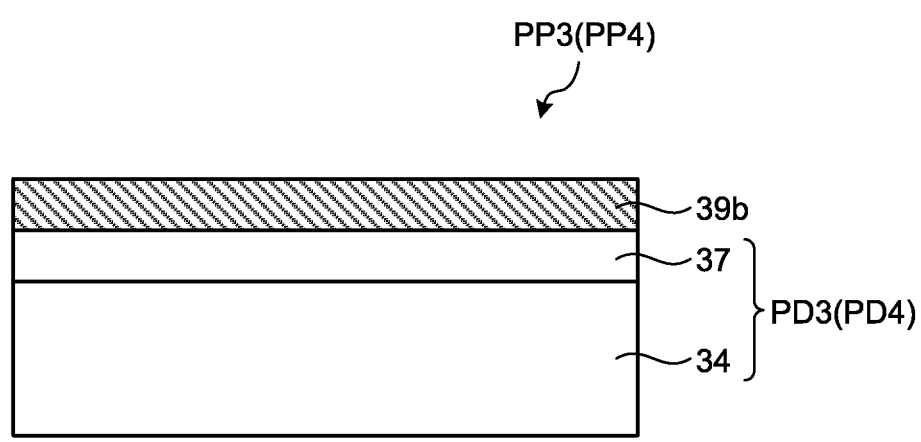
FIG. 18 is an explanatory diagram for explaining an example of a third light receiver of the detector.

FIG. 17 is an explanatory diagram for explaining an example of the first light receiver PD1 of the detector 35. FIG. 18 is an explanatory diagram for explaining an example of the third light receiver PD3 of the detector 35. The generator 41 is, for example, a light-emitting diode. As illustrated in FIG. 3, the source light 71 emitted from the generator 41 passes through the optical scale 11 and then passes through the polarization layers PP1, PP2, PP3, and PP4 as the incident light 73, before falling on the first light receiver PD1, the second light receiver PD2, the third light receiver PD3, and the fourth light receiver PD4. In the planar view from the z-axis direction; the first light receiver PD1, the second light receiver PD2, the third light receiver PD3, and the fourth light receiver PD4 are arranged around the generator 41. The first light receiver PD1, the second light receiver PD2, the third light receiver PD3, and the fourth light receiver PD4 have an equal distance to the placement center S0. This structure reduces the computational load of the CPU 4c serving as the computing unit.

As illustrated in FIG. 17, the first light receiver PD1 includes a silicon substrate 34, a light receiver 37, and a first polarization layer 39a. As illustrated in FIG. 18, the third light receiver PD3 includes the silicon substrate 34, the light receiver 37, and a second polarization layer 39b. For example, the silicon substrate 34 is an n-type semiconductor, the light receiver 37 is a p-type semiconductor, and a photodiode can be configured using p-n junction of the silicon substrate 34 and the light receiver 37. The first polarization layer 39a and the second polarization layer 39b can be formed of light-induced polarization layers or a wire grid pattern in which metallic thin wires are arranged in parallel. The first polarization layer 39a separates a component in a first polarization direction from the incident light 73, which falls onto the optical scale 11 illustrated in FIG. 3 from the source light 71, and the second polarization layer 39b separates a component in a second polarization direction from the incident light 73. Herein, it is desirable that the polarizing axis of the first separated light and the second separated light are relatively different by 90°. This structure enables the CPU 4c of the arithmetic device 3 to compute the polarization angle easily.

Similarly, with reference to FIGS. 17 and 18, the second light receiver PD2 includes the silicon substrate 34, the light receiver 37, and the first polarization layer 39a. Moreover, as illustrated in FIG. 18, the fourth light receiver PD4 includes the silicon substrate 34, the light receiver 37, and the second polarization layer 39b. For example, the silicon substrate 34 is an n-type semiconductor, the light receiver 37 is a p-type semiconductor, and a photodiode can be configured using p-n junction of the silicon substrate 34 and the light receiver 37. The first polarization layer 39a and the second polarization layer 39b can be formed of light-induced polarization layers or a wire grid pattern in which metallic thin wires are arranged in parallel. The first polarization layer 39a separates a component in the first polarization direction from the incident light 73, which falls onto the optical scale 11 illustrated in FIG. 3 from the source light 71, and the second polarization layer 39b separates a component in the second polarization direction from the incident light 73. Herein, it is desirable that the polarizing axis of the first separated light and the second separated light are relatively different by 90°. This structure enables the CPU 4c of the arithmetic device 3 to compute the polarization angle easily.

The first light receiver PD1, the second light receiver PD2, the third light receiver PD3, and the fourth light receiver PD4 respectively receive light via the polarization layers PP1, PP2, PP3, and PP4 that separate corresponding components in different polarization directions from the incident light 73. For that reason, it is desirable that the polarizing axis for separation by the polarization layer PP1 and the polarizing axis for separation by the polarization layer PP2 are relatively different by 45°. Moreover, it is desirable that the polarizing axis for separation by the polarization layer PP2 and the polarizing axis for separation by the polarization layer PP3 are relatively different by 45°.

Furthermore, it is desirable that the polarizing axis for separation by the polarization layer PP3 and the polarizing axis for separation by the polarization layer PP4 are relatively different by 45°. Moreover, it is desirable that the polarizing axis for separation by the polarization layer PP4 and the polarizing axis for separation by the polarization layer PP1 are relatively different by 45°. This structure enables the CPU 4c of the arithmetic device 3 to compute the polarization angle easily.

Figure 19:
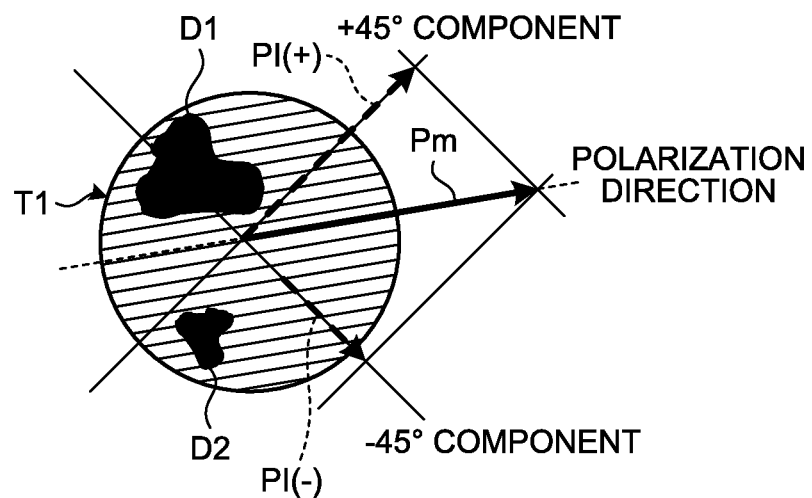
FIG. 19 is an explanatory diagram for explaining the separation of polarization components performed with the optical scale.
Figure 20:
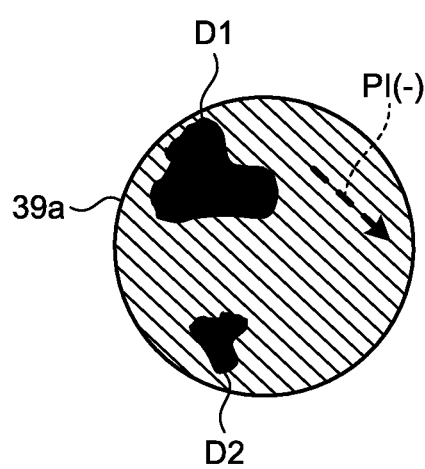
FIG. 20 is an explanatory diagram for explaining the separation of polarization components performed with the optical scale.
Figure 21:
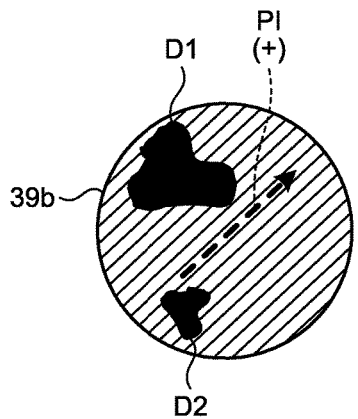
FIG. 21 is an explanatory diagram for explaining the separation of polarization components performed with the optical scale.

FIGS. 19 to 21 are explanatory diagrams for explaining the separation of polarization components performed with the optical scale 11. As illustrated in FIG. 19, the incident light is polarized in the polarization direction Pm by the signal track T1 of the optical scale 11. In FIG. 19, foreign particles D1 and D2 are present in the detection area. The polarization direction Pm of the incident light can be expressed using a light intensity PI(−) of the components in the first polarization direction and a light intensity PI(+) of the components in the second polarization direction. As described above, it is desirable that the first polarization direction and the second polarization direction are different by 90° and, for example, having a +45° component and a −45° component with respect to a reference direction. In FIGS. 19 to 21, the axis directions of the wire grid are illustrated to be parallel to the paper plane. However, if the axis directions of the wire grid are inclined at the same angle with respect to the paper plane, but the inclination angle is small, the inclination has no influence on the function of polarization separation. That is, even if the optical scale 11 is inclined with respect to the rotational axis, it functions as a polarization separation element.

As illustrated in FIG. 20, the first light receiver PD1 detects the incident light via the first polarization layer 39a that separates a component in the first polarization direction from the incident light, and therefore detecting the light intensity PI(−) of the component in the first polarization direction. As illustrated in FIG. 21, the third light receiver PD3 detects the incident light via the second polarization layer 39b that separates a component in the second polarization direction from the incident light, thus detecting the light intensity PI(+) of the component in the second polarization direction. Similarly, as illustrated in FIG. 20, the second light receiver PD2 detects the incident light via the first polarization layer 39a that separates a component in the first polarization direction from the incident light, thus detecting the light intensity PI(−) of the component in the first polarization direction. As illustrated in FIG. 21, the fourth light receiver PD4 detects the incident light via the second polarization layer 39b that separates a component in the second polarization direction from the incident light, thus detecting the light intensity PI(+) of the component in the second polarization direction.

Figure 23:
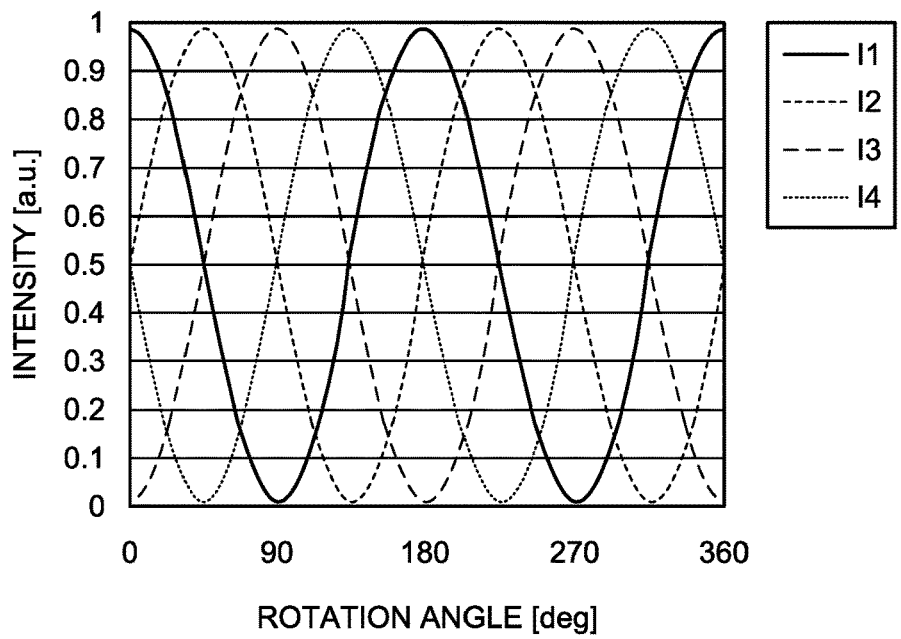
FIG. 23 is an explanatory diagram for explaining the angle of rotation of the optical scale and the variation in the light intensity of the polarization component of each light receiver.

FIG. 22 is a functional block diagram of the optical encoder 2. FIG. 23 is an explanatory diagram for explaining the angle of rotation of the optical scale 11 and the variation in the light intensity of the polarization component of each light receiver. As illustrated in FIG. 22, the generator 41 emits light based on the reference signal and irradiates the optical scale 11 with the source light 71. The incident light 73 as the transmitted light is received by the detector 35. The differential operation circuit DS performs a differential operation using the detection signal that is output from the detector 35 and is amplified by the pre-amplifier AMP. Herein, the pre-amplifier AMP may be omitted depending on the magnitude of the output of the detector 35.

The differential amplifier circuit DS obtains the light intensity PI(−) of the component in the first polarization direction (a first separated light) and obtains the light intensity PI(+) of the component in the second polarization direction (a second separated light). The outputs of the first light receiver PD1, the second light receiver PD2, the third light receiver PD3, and the fourth light receiver PD4 corresponding to the light intensity PI(−) and the light intensity PI(+) are, for example, light intensities I1, I2, I3, and I4, respectively, having shifted phases according to the rotation of the optical scale 11 as illustrated in FIG. 23.

According to Equations (1) and (2), the differential operational circuit DS calculates, from the light intensity PI(−) of the component in the first polarization direction and the light intensity PI(+) of the component in the second polarization direction, a differential signal Vc and a differential signal Vs that are dependent on the rotation of the optical scale 11. The differential signal Vc corresponds to what is called the cosine (cos) component, and the differential signal Vs corresponds to what is called the sine (sin) component.

$$Vc=(I1-I3)/(I1+I3) \tag{1}$$

$$Vs=(I2-I4)/(I2+I4) \tag{2}$$

In this way, based on the light intensities I1 and I3, the differential operation circuit DS calculates the sum [I1+I3] of the light intensities and the difference [I1−I3] of the light intensities, and calculates the differential signal Vc by dividing the difference [I1−I3] of the light intensities by the sum [I1+I3] of the light intensities. Moreover, based on the light intensities I2 and I4, the differential operation circuit DS calculates the sum [I2+I4] of the light intensities and the difference [I2−I4] of the light intensities, and calculates the differential signal Vs by dividing the difference [I2−I4] of the light intensities by the sum [I2+I4] of the light intensities. In the differential signals Vc and Vs calculated according to Equations (1) and (2), respectively, there is no parameter that is affected by the light intensity of the source light 71, and the output of the sensor 31 can reduce the effect of the distance between the detector 35 and the optical scale 11 and the effect of variability in the light intensity of the generator 41. The differential signals Vc and Vs are functions of an angle of rotation (hereinafter, called an angle of polarization) β of the polarizing axis of the optical scale 11 as the angle of rotation of the optical scale 11. However, if an auto power control (APC) is provided for controlling the amount of light of the light source in the generator 41 to a constant amount, the division described above need not be calculated.

Figure 24:
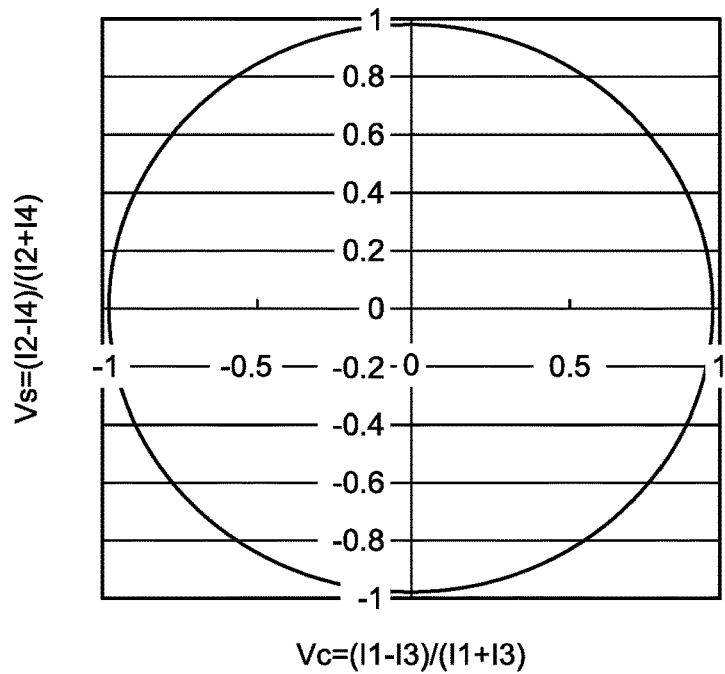
FIG. 24 is an explanatory diagram for explaining a relationship between the angle of rotation of the optical scale and the Lissajous angle.

As illustrated in FIG. 22, the differential signals Vc and Vs are input to the filter circuit NR and are subjected to noise removal. Then, in the multiplication circuit AP, a Lissajous pattern illustrated in FIG. 24 is calculated from the differential signals Vc and Vs, and the absolute angle of the angle of rotation of the rotor 10, which has rotated from the initial position, can be identified. The differential signals Vc and Vs are differential signals having the phase shift of λ/4. Hence, a Lissajous pattern is calculated with the cosine curve of the differential signal Vc taken along the horizontal axis and the sine curve of the differential signal Vs taken along the vertical axis; and the Lissajous angle is determined according to the angle of rotation. For example, when the rotor 10 rotates once, the Lissajous pattern illustrated in FIG. 24 makes two laps. The arithmetic device 3 has a function of storing information about whether the rotational position of the optical scale 11 is within the range of 0° or greater to smaller than 180° or whether the rotational position of the optical scale 11 is within the range of 180° or greater to smaller than 360°. With that, the optical encoder 2 can be handled as an absolute encoder capable of calculating the absolute position of the rotor 10.

Figure 25:
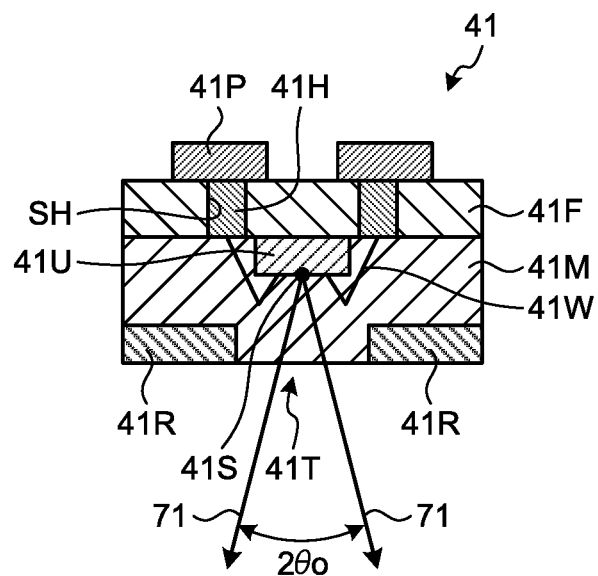
FIG. 25 is a diagram for explaining the generator.

FIG. 25 is a diagram for explaining the generator 41. The generator 41 illustrated in FIG. 25 is a light emitting element in which the light emitting device 41U such as a light-emitting diode is packaged. Alternatively, the light emitting device 41U may have some other configuration. More particularly, for example, the light emitting device 41U may be a laser source such as a vertical resonator surface-emitting laser or a filament. The generator 41 includes a base substrate 41F, a penetrating conductive layer 41H that is embedded in a through hole SH, an external electrode 41P that is electrically connected to the penetrating conductive later 41H, the light emitting device 41U that is mounted on the base substrate 41F, a bonding wire 41W that conductively connects the light emitting device 41U to the penetrating conductive layer 41H, an encapsulation resin 41M that protects the light emitting device 41U, and a light blocking film 41R.

The light blocking film 41R of the generator 41 has the function of a diaphragm for causing the source light 71, which is emitted by the light emitting device 41U, to be narrowed down within the range of an outgoing surface 41T. The outgoing surface 41T has no lens face, and the light distribution of the source light 71 exhibits the light distribution of a predetermined angle 2θo with respect to the cross-section of the outgoing surface 41T. The predetermined angle 2θo of the light distribution is dependent on the generator 41. Although the angle 2θo is, for example, equal to 30°, it can be set to be greater or smaller than 30°.

The sensor 31 can make use of the generator 41 not having a lens attached thereto. By setting the distance D between the light emission point 41S of light of the generator 41 and the placement center S0 (the detector 35) to be short, the SN ratio can be improved. The distance W to each of the first light receiver PD1, the second light receiver PD2, the third light receiver PD3, and the fourth light receiver PD4 can be set in a range in which the light receivers can receive the light and the effect of the diffused light of the generator 41 can be decreased. That leads to an enhancement in the measurement accuracy of the sensor 31 and the optical encoder 2. Obviously, it is also possible to use the generator 41 having a lens.

Figure 26:
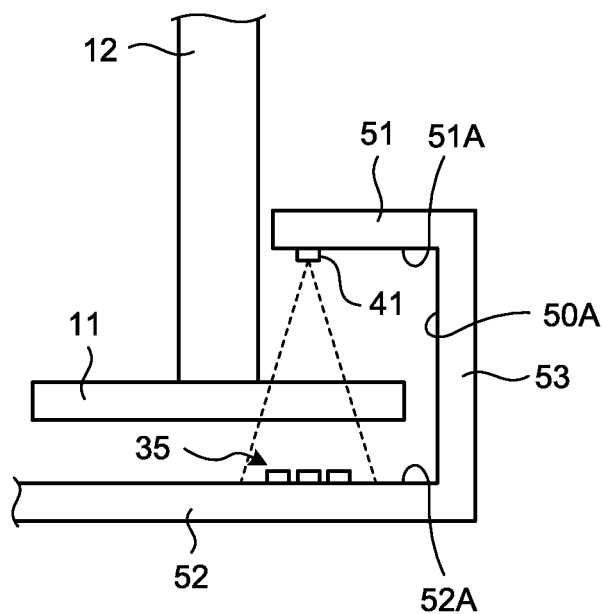
FIG. 26 is a diagram illustrating a relationship between the outgoing range of the light from the generator, and the positions of the detector and a shaft.

FIG. 26 is a diagram illustrating a relationship between the outgoing range of the light from the generator 41, and the positions of the detector 35 and the shaft 12. In the present embodiment, light is the detection target generated by the generator 41 and detected by the detector 35. The outgoing angle (the angle 2θo mentioned above) of the source light 71 in the generator 41 can be arbitrarily set in the design. Thus, as illustrated in FIG. 26, it can be ensured that, while the entire light receiving area for the detector 35 is included within the range of the outgoing angle of the source light 71, the joining member 53 and the shaft 12 are not included in that range. However, it is difficult to cause the source light 71 from the light-emitting diode as a light source to thoroughly fall within the outgoing range and thus to eliminate the leakage of light. Moreover, also taking into account the reflected light and the like after the output of the light, it is difficult to prevent all of the other light (for example, the diffused reflection light) other than the source light 71 from entering the detector 35. In that regard, in the present embodiment, with the aim of reducing the reflected light, antireflection treatment is applied to the face of the substrate 50 on which the light emitting devices are installed. More particularly, as the antireflection treatment, it is possible to perform a coating operation in which an antireflection material such as a black coating material having the light absorption property is applied at least to the face on which the generator 41 and the detector 35 are disposed (i.e., the top face 50A) from among the board surfaces of the substrate 50.

Moreover, by taking into account the possibility of reflection of the light at the outer periphery of the shaft 12, the antireflection treatment may be applied also to the shaft 12. In that case, the sensor 31 is configured to include a scale (the optical scale 11), which affects the light by being rotated in the target area for detection representing the space in between the generator 41 and the detector 35, and a rotation supporting member (the body 21 of the stator 20) including the shaft 12 that supports the scale in a rotatable manner and to which the antireflection treatment has been applied. More particularly, for example, plate processing of a black oxide film or the abovementioned coating operation can be performed as the antireflection treatment on the outer periphery of the metallic shaft 12. With the same idea, antireflection treatment may be applied to the inner periphery of the stator 20 that houses the optical scale 11 and the substrate 50.

Figure 27:
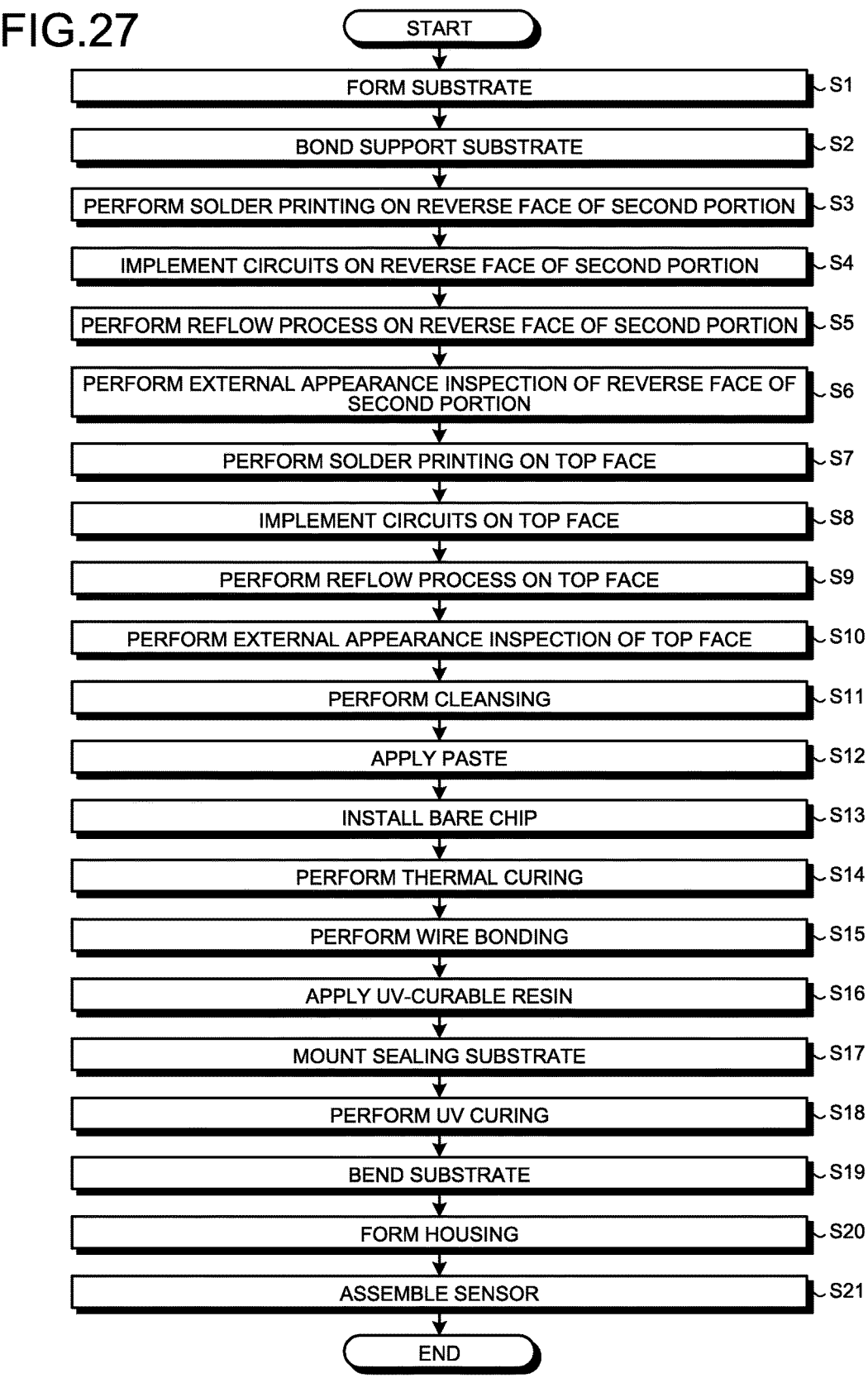
FIG. 27 is a flowchart for explaining an exemplary flow of processes related to the manufacturing of the sensor.

Explained below with reference to a flowchart illustrated in FIG. 27 is a method for manufacturing the sensor 31. FIG. 27 is a flowchart for explaining an exemplary flow of processes related to the manufacturing of the sensor 31. The following explanation is given about the operation processes centered on the manufacturing worker and the machines that are operated by the manufacturing worker for the manufacturing purposes. Firstly, the substrate 50 is formed in which the first portion 51 having the generator 41 disposed thereon and the second portion 52 having the detector 35 disposed thereon are formed in an integrated manner (Step S1). More particularly, for example, as illustrated in FIG. 13, an FPC is formed that includes the semi-arc-like first portion 51, the circular second portion 52, the joining member 53 that joins the first portion 51 and the second portion 52, and the harness portion 54 that extends from the first portion 51 and on the side opposite to the joining member 53. In this process, wiring such as signal lines and power lines, which are to be connected to various circuits mounted on the substrate 50 in the latter processes, are formed on the FPC. Moreover, antireflection treatment is applied to the top face of the FPC. At that time, antireflection treatment is not applied to the terminal portion to which the wiring of various circuits including the detector 35 is to be connected. In this way, the method for manufacturing the sensor 31 (the optical sensor) according to the present embodiment includes the process of forming the substrate 50 in which the first portion 51 having the generator 41 disposed thereon and the second portion 52 having the detector 35 disposed thereon are formed in an integrated manner.

Subsequently, various components are mounted on the substrate 50. More particularly, for example, firstly, the support substrate 65 is bonded to the reverse face 51B of the first portion 51 (Step S2). Then, various processes are implemented for the purpose of installing the IC circuit 60 on the reverse face 52B of the second portion 52. More particularly, the IC circuit 60 is installed on the reverse face 52B of the second portion 52 according to the following processes: solder printing for the purpose of installing the IC circuit 60 on the reverse face 52B of the second portion 52 (Step S3), implementation of the IC circuit 60 on the reverse face 52B of the second portion 52 (Step S4), a reflow process performed by heating the reverse face 52B of the second portion 52 after the implementation at Step S4 (Step S5), and an external appearance inspection of the soldering of the reverse face 52B of the second portion 52 (Step S6). In this way, the method for manufacturing the sensor 31 (the optical sensor) according to the present embodiment includes the process of mounting tabular supporting members (the IC circuit 60 and the support substrate 65) on the reverse faces (i.e., the reverse faces 51B and 52B) opposite to the faces on which electronic components (the top faces 51A and 52A) are installed, the tabular supporting members being members maintaining the faces on which electronic components are installed in a plane, the faces on which electronic components are installed including the face (i.e., the top face 51A) of the first portion 51 on which electronic components including the generator 41 are installed and the face (i.e., the top face 52A) of the second portion 52 on which electronic components including the detector 35 are installed.

Subsequently, various processes for mounting components on the top face 50A of the substrate 50 are performed. More particularly, components to which wiring is to be connected by soldering are attached to the top face 50A according to the following processes: solder printing for the purpose of installing some part of the generator 41 and the components 61 on the top face 51A of the first portion 51 and of installing the detector 35 on the top face 52A of the second portion 52 (Step S7), implementation of various circuits including the generator 41 and the detector 35 on the top face 50A (Step S8), a reflow process performed by heating the top face 50A after the implementation at Step S8 (Step S9), and an external appearance inspection of the soldering of the top face 50A (Step S10). Then, the substrate 50 is cleansed (Step S11). After the cleansing of the substrate 50, a paste (for example, Ag paste) for attaching a bare chip, which is a part of the components 61, is applied to the top face 50A (Step S12); the bare chip is installed (Step S13); and the bare chip is fixed using thermal curing (Step S14). Then, the bare chip and the wiring of the substrate 50 are joined by wire bonding (Step S15). After performing the wire bonding, a resin that becomes cured by ultraviolet light (UV-curable resin) is applied to the top face 50A of the substrate 50 (Step S16); a sealing substrate (for example, a glass substrate) is disposed on the top face 50A to which the UV-curable resin has been applied (Step S17); and an UV curing operation is performed in which the UV-curable resin is cured by irradiating it with ultraviolet light (Step S18). In this way, the method for manufacturing the sensor 31 (the optical sensor) according to the present embodiment includes the process of installing the generator 41 at the first portion 51 and installing the detector 35 at the second portion 52. Herein, when the face of the substrate 50 on which a tabular member (for example, the support substrate 65) is disposed (i.e., the reverse face 50B) is considered as the one face, the generator 41 and the detector 35 are installed on the other face (the top face 50A). Moreover, one or more electronic components (for example, the detector 35 and the components 61) installed on the top face 52A of the second portion 52 are installed within an area in which the package of the IC circuit 60 is disposed on the reverse face 52B.

The wire bonding is, for example, Au wire bonding using gold wires. However, that is only exemplary, and the wire bonding is not limited to that example but can be appropriately changed. Moreover, instead of using the wire bonding, the tape automated bonding (TAB) may be used or a bare chip may be soldered as a flip chip to the wiring of the substrate.

Subsequently, the generator 41 and the detector 35 are positioned opposite to each other. More particularly, for example, the substrate 50 is bent at two positions in such a way that the face (i.e., the top face 51A) of the first portion 51 on which the generator 41 is installed and the face (i.e., the top face 52A) of the second portion 52 on which the detector 35 is installed are parallel and opposite to each other (Step S19). In this way, the method for manufacturing the sensor 31 (the optical sensor) according to the present embodiment includes the process of bending the substrate 50, which is a flexible substrate (FPC), in such a way that the face (i.e., the top face 51A) of the first portion 51 on which the generator 41 is installed and the face (i.e., the top face 52A) of the second portion 52 on which the detector 35 is installed are opposite to each other.

As explained in the processes at Steps S7 to S14, the method for manufacturing the sensor 31 (the optical sensor) according to the present embodiment includes the process of installing the generator 41 at the first portion 51 and installing the detector 35 at the second portion 52. It is desirable that: the first light receiver PD1 to the fourth light receiver PD4 are placed at different positions on a predetermined plane (for example, the top face 52A); the distance (the distance W) to a single point in the predetermined plane is equal from each of the four light receiving devices; and the four line segments connecting the single point with the centers of the light receiving areas of the four light receiving devices are at right angles with each other. Moreover, it is desirable that, after the substrate 50 is bent, the straight line L2 representing the normal of a predetermined plane (the top face 52A) passing through a single point (the placement center S0) passes through the center of the light emission point 41S of the generator 41. Furthermore, it is desirable that the generator 41 and the detector 35 are installed by taking into account the points given above. More particularly, a first condition is to be satisfied indicating that the first axis LA representing the bending axis at the bending position 55a and the second axis LB representing the bending axis at the bending position 55b are parallel to each other. Moreover, a second condition is to be satisfied indicating that the distance (the distance W1) between the first axis LA and a first point representing the center point for generation for the generator 41 (for example, the light emission point 41S) on the plane prior to the bending of the substrate 50 is set to be equal to the distance (the distance W2) between the second axis LB and a second point representing either the center of the detection area in which the detector 35 detects the detection target or the placement center of a plurality of detection areas of the detector 35 (for example, the placement center S0). Furthermore, a third condition is to be satisfied indicating that the first point and the second point are present on the same straight line (for example, the straight line L1) intersecting the first axis LA and the second axis LB at right angles (or intersecting the first axis LA and the second axis LB in a raised manner) in the pre-bending substrate 50. To satisfy the first condition, the second condition, and the third condition, the wiring of the generator 41 and the detector 35 is formed in forming the substrate 50, the first axis LA and the second axis LB are determined, and the placement of the generator 41 and the detector 35 in installation thereof is determined.

Subsequently, a housing (for example, the stator 20) is formed (Step S20). More particularly, a housing is formed that includes a second member (for example, the body 21) and a first member (for example, the underbody 22). The second member is a member which supports, in a movable manner, the member (for example, the optical scale 11) that exerts influence on the light by being moved in the target area for detection representing the space in between the generator 41 and the detector 35. The first member is a member to which some part of the substrate 50 is fixed. In the present embodiment, the cover 23 is further formed as a component of the stator 20 that represents the housing of the substrate 50 and the optical scale 11. However, given here is only a specific example of the housing, and the housing is not limited to this example. Alternatively, for example, the cover 23 may be integrated with the underbody 22. Moreover, the shaft 12, which is disposed in the body 21 representing the second member, may be a shaft having the antireflection treatment applied to the outer periphery thereof. Moreover, in the stator 20 in which the substrate 50 and the optical scale 11 are to be housed, the antireflection treatment may be applied to the inner periphery.

Subsequently, the process of assembling the sensor 31 (Step S21) is performed. Given below is the explanation of the process related to the assembly during the manufacturing of the sensor 31. During the manufacturing of the sensor 31, the substrate 50 and the motion body (for example, the optical scale 11) are relatively-moved in such a way that the motion body enters the area in between the generator 41 and the detector 35 (i.e., the target area for detection). Specifically, in manufacturing the sensor 31, as illustrated FIGS. 14 and 15, the substrate 50 and the motion body are relatively-moved in such a way that the motion body enters the area (the target area for detection) from a side opposite to the joining member 53. In the substrate 50, the joining member 53 is positioned on the side opposite to the harness portion 54 across the second portion 52. Hence, in the present embodiment, the substrate 50 and the motion body are relatively-moved in such a way that the motion body enters the target area for detection from the harness portion 54 side.

More particularly, with reference to a predetermined plane (for example, the top face 52A of the second portion 52), it is ensured that the first portion 51 and the second portion 52 of the bent substrate 50 and the board surface of the optical scale 11 are along the predetermined plane. In that state, at least one of the stator 20 including the optical scale 11 and the substrate 50 is moved in the direction along the predetermined plane so that the optical scale 11 is disposed in the target area for detection. For example, of the cylindrical outer periphery of the stator 20, at the position at which the optical scale 11 is disposed, an opening (for example, the opening 21a) is formed through which the substrate 50 can be inserted in the direction along the board surface of the optical scale 11, and the entry of the substrate 50 in that opening leads to the positioning of the optical scale 11 in the target area for detection. In that case, the substrate 50 is inserted in the opening 21a from the harness portion 54 side. Moreover, the semi-arc-like first portion 51 enters the side of the optical scale 11 on which the shaft 12 is present, and the circular second portion 52 enters the side of the optical scale 11 on which the shaft 12 is not present.

In the present embodiment, the first portion 51 and the second portion 52 are parallel to each other. The method for manufacturing the sensor 31 according to the present embodiment includes the process in which, with the top face 52A of the second portion 52 as the predetermined plane, at least one of the stator 20 including the optical scale 11 and the substrate 50 is moved in the direction along the predetermined plane. Thus the direction of relative movement of the substrate 50 and the motion body is along the first portion 51 and the second portion 52.

The process related to the assembly during the manufacturing of the sensor 31 will be explained with reference to an actual example. Firstly, the substrate 50 is attached to the first member (the underbody 22) representing one of a plurality of members constituting the housing (the stator 20) of the sensor 31. Then, the first member is brought close to the second member (the body 21), which is one of the plurality of members constituting the housing and which supports the motion body so as to assemble the housing and to make the substrate 50 and the motion body perform relative movement in such a way that the motion body enters the area in between the generator 41 and the detector 35. More particularly, as illustrated in FIG. 10, the second portion 52 of the substrate 50 is fixed to the underbody 22. Then, as illustrated in FIG. 14, the underbody 22 to which the second portion 52 is fixed and the body 21 in which the rotor 10 is disposed in a rotatable manner are set to have such a positional relationship that the first portion 51, the second portion 52, and the optical scale 11 are substantially parallel to each other and that the optical scale 11 is positioned in the target area for detection in between the first portion 51 and the second portion 52. That is, the first portion 51, the second portion 52, and the optical scale 11 are set to have the positional relationship of being along the predetermined plane. With such a positional relationship, the body 21 and the underbody 22 are moved closer to each other along the predetermined plane in such a way that the underbody 22 moves in from the opening 21a of the body 21, and made to be abut against each other; and thus the body 21 and the underbody 22 are assembled. As a result, the optical scale 11 is disposed in the target area for detection. Herein, in bringing the body 21 and the underbody 22 close to each other with the positional relationship in which the optical scale 11 is positioned in the target area for detection in between the first portion 51 and the second portion 52, it is desirable that the support substrate 65, which is bonded to the reverse face 51B of the first portion 51, and the bonding face 21c of the body 21 do not abut against each other. Then, in assembling the body 21 and the underbody 22 by making them abut against each other, the underbody 22 is pushed closer to the bonding face 21c so that the support substrate 65 and the bonding face 21c abut and bonded to each other. In this assembly method, while one face of the tabular member (the support substrate 65) is bonded to the face (for example, the reverse face 51B) of the other portion (for example, the first portion 51) on the side opposite to the target area for detection; the other face of the tabular member is bonded to the second member (for example, the body 21). It is desirable that various specific design items such as the length of the joining member 53, the length of extension of the shaft 12 on the bonding face 21c side, and the thickness of the support substrate 65 are set to enable the assembly of the body 21 and the underbody 22 as described above. In this way, the method for manufacturing the sensor 31 (the optical sensor) according to the present embodiment includes the process of fixing one (for example, the second portion 52) of the first portion 51 and the second portion 52 to the first member (for example, the underbody 22), and bonding the face (for example, the reverse face 51B) of the other portion (for example, the first portion 51) of the first portion 51 and the second portion 52, which is on the side opposite to the target area for detection, to the second member (for example, the body 21).

The body 21 and the underbody 22 have the structure corresponding to the assembly process in which the substrate 50 and the motion body (for example, the optical scale 11) are relatively-moved so that the motion body enters the area in between the generator 41 and the detector 35 (i.e., the target area for detection). More particularly, the underbody 22 includes an arc-like positioning part 22a that is formed to circumscribe the second portion 52 of the disposed substrate 50. The positioning part 22a has a notch for enabling the harness portion 54 to extend in the direction of relative movement of the body 21 and the underbody 22 in assembly. Moreover, as illustrated in FIGS. 10 and 15, the positioning part 22a may have a notch also at the position corresponding to the joining member 53. An arc-like outer periphery 22b of the positioning part 22a has the shape running along an inner periphery 21e of an arc-like wall 21d of the body 21 that covers the outer side of the optical scale 11. For that reason, in the assembly process, of the outer periphery 22b of the positioning part 22a of the underbody 22, some portion on an extending side of the harness portion 54 abuts against the inner periphery 21e of the wall 21d of the body 21. That leads to the establishment of the positional relationship between the substrate 50 and the motion body due to which the optical scale 11 is present on the straight line L2 (see FIG. 12). In other words, the positioning part 22a and the wall 21d function as a positioning structure for enabling the establishment of the positional relationship between the substrate 50 and the motion body (for example, the optical scale 11). Moreover, with respect to a radial direction with the direction of extension of the shaft 12 serving as the central axis, the underbody 22 has a stepped face 22c formed to extend to the outside of the positioning part 22a. When the body 21 and the underbody 22 are assembled, the stepped face 22c abuts against a lower end 21f of the wall 21d of the body 21. As a result, with respect to the direction of extension of the shaft 12, the positional relationship between the body 21 and the underbody 22 is determined, as well as the positional relationship between the substrate 50 and the motion body (for example, the optical scale 11) is determined. In other words, the underbody 22, which includes the positioning part 22a and the stepped face 22c, and the body 21, which includes the wall 21d, function as a positioning structure for enabling the establishment of the positional relationship between the substrate 50 and the motion body (for example, the optical scale 11). In the present embodiment, the stepped face 22c, the lower end 21f, and the optical scale 11 are positioned along the direction of relative movement of the body 21 and the underbody 22. Moreover, the underbody 22 is provided on the substrate 50 in such a way that the top face 52A runs along (or is parallel to) a stepped face 55c. Because of the structure of the body 21 and the underbody 22, the parallel relationship of the optical scale 11 with the first portion 51 and the second portion 52 is also established. Moreover, because of the notch 51a, even after the assembly of the body 21 and the underbody 22, the shaft 12 and the substrate 50 do not make contact with each other. This prevents a situation in which the rotation of the shaft 12 is hampered due to the contact with the substrate 50. In this way, in the method for manufacturing the sensor 31 according to the present embodiment, a notch (the notch 51a) is formed in the first portion 51 so as to ensure that, while the motion body remains in the area in between the generator 41 and the detector 35, the shaft 12 and the substrate 50 do not make contact with each other.

After the assembly of the body 21 and the underbody 22, the harness portion 54 extends from the notch 21b that is formed on the side opposite to the opening 21a of the body 21. Subsequently, when the cover 23 and the underbody 22 are separate parts, the cover 23 is attached to cover the opening 21a of the body 21. That is, in the method for manufacturing the sensor 31 according to the present embodiment, after the assembly of the first member (the underbody 22) and the second member (the body 21), an entrance (the opening 21a) for the substrate 50 formed in the second member is covered by a cover member (the cover 23). In FIGS. 13 to 16, some of the circuits such as the detector 35 are not illustrated. However, in practice, various circuits including the detector 35 are already installed.

When the connector CNT is already installed on the substrate 50, for example, at the stage of position adjustment of the body 21 and the underbody 22 prior to the relative movement of the body 21 and the underbody 22, the positional relationship can be such that the leading end of the harness portion 54 is already exposed to the outside of the body 21. As a result, in the relative movement of the body 21 and the underbody 22 for the purpose of making the motion body enter the area in between the generator 41 and the detector 35, the connector CNT is prevented from being caught in the notch 21b and from passing therethrough, and thus the assembly can be performed in a favorable manner. The connector CNT can be installed on the substrate 50 before the assembly of the housing (the stator 20). Obviously, the connector CNT can be installed also after the assembly of the housing.

In this way, the housing of the sensor 31 includes the first member (the underbody 22), on which the substrate 50 is mounted, and the second member (the body 21), at which the motion body is disposed. The housing of the sensor 31 is assembled by relatively moving the second member and the first member in the predetermined direction to make them abut against each other. Herein, the predetermined direction is the direction in which the motion body can be entered in the area in between the generator 41 and the detector 35 (i.e., the target area for detection).

As described above, according to the present embodiment, since the substrate 50 includes the first portion 51, at which the generator 41 is installed, and the second portion 52, at which the detector 35 is installed, the simple task of bending or curving the substrate 50 enables performing the positioning of the generator 41 and the detector 35. In this way, according to the present embodiment, the positioning of the generator 41 and the detector 35 becomes easier. Moreover, since the positioning can be easily performed, the manufacturing process related to the positioning can be simplified. Hence, according to the present embodiment, the manufacturing of the sensor becomes easier. Furthermore, since the substrate 50 and the motion body are relatively-moved in such a way that the motion body enters the area in between the generator 41 and the detector 35, because of the generator 41 and the detector 35 that are disposed on the substrate 50 having the first portion 51 and the second portion 52 formed in an integrated manner, it becomes possible to manufacture the sensor 31 capable of performing sensing related to the motion of the motion body.

Moreover, because of the joining member 53, the space can be allocated in between the first portion 51 and the second portion 52 with more ease. For that reason, the target area for detection can be easily provided in between the generator 41 and the detector 35. Furthermore, since the motion body enters the area (the target area for detection) from the side opposite to the joining member 53, not only the positioning and the manufacturing becomes easier but the advantage of having the joining member 53 can also be utilized.

Furthermore, as a result of providing the first portion 51 and the second portion 52 to be parallel to each other, the positional relationship between the generator 41, which is installed on the first portion 51, and the detector 35, which is installed on the second portion 52, can be adjusted based on the relationship between the first portion 51 and the second portion 52. For that reason, when the generator 41 has directional characteristics, the positional adjustment for keeping the detector 35 within the area of generation of the detection target detected by the generator 41 becomes easier as well as the design related to the positional angle in installing the generator 41 and the detector 35 on the substrate 50 becomes easier. Moreover, by keeping the direction of relative movement of the substrate 50 and the motion body along the first portion 51 and the second portion 52, the reference for the direction of relative movement can be determined with more ease and it can be made harder for the substrate 50 and the motion body to come in contact with each other during the relative movement. Hence, the motion body can be made to enter the area (the target area for detection) with more ease.

Furthermore, as a result of forming a notch (for example, the notch 51*a*) for ensuring that the shaft 12 and the substrate 50 do not make contact with each other while the motion body remains in the area in between the generator 41 and the detector 35, it becomes possible to prevent the substrate 50 from making contact with the shaft 12, thus preventing a situation in which the movement of the shaft 12 is hampered.

Moreover, as a result of assembling the housing by bringing the first member (for example, the underbody 22) and the second member (for example, the body 21) close to each other and as a result of making the substrate 50 and the motion body perform relative movement in such a way that the motion body enters the area in between the generator 41 and the detector 35, the motion body can be made to enter the area in between the generator 41 and the detector 35 at the same time during the single process of assembling the housing. Furthermore, the adjustment of the positional relationship between the motion body and the rays in between the generator 41 and the detector 35 can also be determined according to the positional relationship between the first member and the second member during the assembly of the housing. Hence, the sensor 31 according to the present embodiment can be manufactured easily.

Moreover, after assembling the first member and the second member, the entrance (for example, the opening 21*a*) for the substrate formed in the second member is covered by a cover member (for example, the cover 23), so that the generator 41, the detector 35, and the motion body can be sealed inside the housing. Hence, according to the present embodiment, the sensor 31 can perform the sensing related to the motion of the motion body with more accuracy.

Moreover, by making the joining member 53 include the wiring to be connected to the generator 41, the wiring to be connected to the generator 41 and the joining member 53 can be integrated together. This causes the joining member 53 and the substrate 50 having the wiring to be compact.

Furthermore, since the joining member 53 has a width smaller than the first portion 51 and the second portion 52, the dimensions of the substrate 50 can be kept small as compared to the case in which the width of the substrate 50, which includes the first portion 51 and the second portion 52 across the joining member 53, is kept uniform. Hence, the substrate 50 can be made to be lighter in weight.

Moreover, as a result of bending the substrate 50 at two positions, the target area for detection can be allocated in between the generator 41 and the detector 35 due to the bending of the substrate 50. Moreover, the bending positions can be properly defined.

Furthermore, since the first portion 51 is smaller than the second portion 52, the first portion 51 can be made to be lighter in weight. For that reason, the requirements about the joining member 53 can be kept simpler.

Moreover, since the substrate 50 is bent (for example, in a C-shaped manner) so that the generator 41 and the detector 35 are positioned opposite to each other, some part of the substrate 50 (for example, the second portion 52) can be made to run along a plane in the stator 20 (for example, the planar section of the underbody 22). As a result, while installing the sensor 31 in the housing, handling of the sensor 31 becomes easier.

Furthermore, since the substrate 50 is a flexible substrate, with respect to the sequence of tasks such as installing components including the generator 41 and the detector 35 while the first portion 51 and the second portion 52 are present in the same plane and then processing the substrate 50 for the purpose of securing the target area for detection in between the generator 41 and the detector 35, the sequence of tasks can be carried out with more ease.

Moreover, the substrate 50 includes the harness portion 54 that includes the wiring to be connected to the generator 41 and the detector 35. Hence, the wiring to be connected to the configuration of the sensor 31, which includes the generator 41 and the detector 35, can be collectively included in the substrate 50. That is, as a result of disposing the harness portion 54, cables need not be individually drawn from components (such as circuits) that require the wiring. Hence, the substrate 50 and the wiring need not be handled individually, thereby making it easier to handle the sensor 31.

Furthermore, when the detector 35 detects the changes in the detection target attributed to the changes in the physical quantity in the target area for detection, the object in which the physical quantity has changed can be handled as the target for sensing by the sensor 31.

Moreover, since electromagnetic waves represent the detection target (for example, the light emitted by the generator 41); the changes in the target area for detection can be detected according to the changes in the electromagnetic waves.

Furthermore, since the changes in the physical quantity are dependent on the rotation of the motion body (for example, the optical scale 11) present in the target area for detection, the rotational movement of the motion body can be treated as the target for sensing by the sensor 31.

Moreover, one of the first portion 51 and the second portion 52 (for example, the second portion 52) is fixed to the first member (for example, the underbody 22), and the face of the other portion (for example, the first portion 51) on the side opposite to the target area for detection is bonded to the second member (for example, the body 21). That is, during the assembly of the sensor 31, it is simply required that one portion is fixed to the first member and the face of the other portion on the side opposite to the target area for detection is bonded to the second member. This makes the assembly of the sensor 31 easier.

Furthermore, just by using a tabular member having adhesive property on both faces (for example, the support substrate 65), the face of the other portion on the side opposite to the target area for detection can be bonded to the second member. Hence, the assembly of the sensor 31 becomes easier.

Moreover, prior to the assembly of the housing (for example, the stator 20), the tabular member (for example, the support substrate 65) is attached to the face of the other portion on the side opposite to the target area for detection. With that, in an integrated state of the tabular member and the substrate 50, the face of the other portion and the second member can be bonded. Hence, the assembly of the sensor 31 becomes easier.

Furthermore, the four light receiving devices are placed at different positions in a predetermined plane (for example, the top face 52A); the distance (the distance W) to a single point (the placement center S0) in the predetermined plane is equal from each of the four light receiving devices; the four line segments connecting the single point with the centers of the light receiving areas of the four light receiving devices are at right angles (θ1 to θ4) with each other; and the normal (the straight line L2) of the predetermined plane passing through the single point passes through the light emission point 41S of the generator 41. Hence, each light receiving device can be set to have the equal distance from the light emitting device. This reduces the variability in the outputs accompanying the detection of the light by the light receiving devices. In this way, according to the present embodiment, the outputs of the light receiving devices can be stabilized to a greater extent.

Moreover, to the faces on the reverse side of the FPC (for example, the reverse faces 51B and 52B), a supporting member is attached for maintaining the faces on the opposite side (for example, the top faces 51A and 52A) in a plane. Hence, the stress on a connecting member between the FPC and the electronic components installed on the FPC can be further reduced. Hence, the faults related to the connecting member between the FPC and the electronic components installed on the FPC can be further reduced. This further enhances the reliability related to the normal operations of the sensor 31. Moreover, since the stress with respect to the connecting member can be reduced, the level of difficulty of installation of the electronic components in the FPC can be lowered, and the electronic components can be more easily installed on the faces on the side opposite to the supporting member.

Furthermore, the package of an integrated circuit (for example, the IC circuit 60) installed on the face on the reverse side (for example, the reverse face 52B) can be utilized as the supporting member of the electronic components installed on the face on the opposite side (for example, the top face 52A). Moreover, since the integrated circuit too is one of the circuits constituting the sensor 31, installing circuits on the both faces of the FPC enables more efficient utilization of the substrate dimensions. Hence, the dimensions of the FPC with respect to the scale of the required circuits can be reduced with more ease. Consequently, downsizing of the sensor 31 can be more easily achieved due to high integration of circuits.

Furthermore, since a tabular member such as the support substrate 65 is disposed that has insulation properties and that is shaped in conformance with the shape of the first portion 51, the face on which electronic components are installed (for example, the top face 51A) can be comprehensively supported by the supporting member.

Moreover, the face of the first portion 51 on which the generator 41 is installed (for example, the top face 51A) and the face of the second portion 52 on which the detector 35 is installed (for example, the top face 52A) are parallel and opposite to each other; the first axis LA and the second axis LB are parallel to each other; the distance W1 between the first point (for example, the light emission point 41S) and the first axis LA is equal to the distance W2 between the second point (for example, the placement center S0) and the second axis LB; and the first point and the second point are present on the same straight line (for example, the straight line L1) intersecting the first axis LA and the second axis LB at right angles (or intersecting the first axis LA and the second axis LB in a raised manner) in the pre-bending substrate 50. Hence, the first point and the second point are present on the same straight line (for example, the straight line L2) that is orthogonal to the first portion 51 and the second portion 52 after the bending of the substrate 50. For that reason, the generator 41 and the detector 35 can be made to be opposite to each other with more accuracy, and thus the output of the detector 35 can be further stabilized.

Furthermore, applying antireflection treatment to the face of the substrate 50 on which the generator 41 and the detector 35 are disposed (i.e., on the top face 50A) reduces the reflection of the light, which is emitted from the generator 41, from the substrate. That enables achieving reduction in the output of the detector 35 attributed to the detection of the reflected light, and thus the output of the detector 35 can be further stabilized.

Moreover, applying antireflection treatment to the shaft 12 reduces the reflection of the light, which is emitted from the generator 41, from the shaft 12. That enables achieving reduction in the output of the detector 35 attributed to the detection of the reflected light, and thus the output of the detector 35 can be further stabilized.

Furthermore, since the sensor 31 functions as a rotary encoder, it becomes possible to detect the angular position of the angle of rotation of the rotating motion body that is coupled to the sensor 31.

Figure 28:
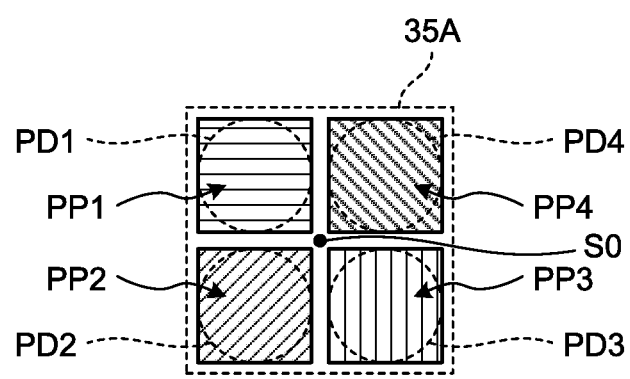
FIG. 28 is a diagram illustrating another example of the placement of a plurality of light receiving devices of the detector.

FIG. 28 is a diagram illustrating another example of the placement of a plurality of light receiving devices of the detector 35. As illustrated in FIG. 28, in the detector 35, the first light receiver PD1 to the fourth light receiver PD4 having tetragonal polarization layers PP1 to PP4, respectively, can be placed around the placement center S0 at four corners of a tetragonal placement area 35A. In this case too, the four light receiving devices may be placed equidistantly from the placement center S0, and the four line segments connecting the placement center S0 to the centers of the light receiving areas of the four light receiving devices can be at right angles with each other. Although the distance from the placement center S0 to each of the four light receiving devices is arbitrary; if the distance is set to be a shorter distance, then the four light receiving devices can be made to detect the light in the state of smaller attenuation of the source light 71 from the generator 41. The four light receiving devices may be separately installed on the second portion 52. Alternatively, the detector 35 may be installed on the second portion 52 as a package in which the positional relationship between the four light receiving devices and the placement center S0 is fixed in advance. As a result of implementing the package, the adjustment of the placement of the four light receiving devices becomes easier.

The first portion 51 and the second portion 52 need not be parallel to each other. Any relationship between the first portion 51 and the second portion 52 can be employed such that the target area for detection can be allocated in between the generator 41 and the detector 35 and that the detection target generated by the generator 41 installed on the first portion 51 is detectable by the detector 35 installed on the second portion 52. Thus, the detailed placement of the first portion 51 and the second portion 52 can be appropriately varied.

Alternatively, the first portion 51 and the second portion 52 may have a converse relationship. That is, the first portion 51 can be fixed to the first member, and the face (the reverse face 52B) of the second portion 52 on the side opposite to the target area for detection may be bonded to the second member. However, in that case, the substrate 50 as well as the circuits (for example, the components 61) installed on the substrate 50 have a configuration in which interference with the configuration of the housing (the stator 20) is taken into account, such as a configuration in which the shape of the second portion 52 is identical to the shape of the first portion 51 according to the embodiment. Moreover, for example, a notch such as the notch 51a that ensures noncontact between the substrate 50 and the shaft 12 is formed according to the range of extension of the shaft 12. For example, if the shaft 12 extends to pass through the optical scale 11 and is present at a position that extends across the first portion 51 and the second portion 52, then the notch is formed in the first portion 51 as well as in the second portion 52.

The joining member 53 may not include the wiring. In that case, from among the first portion 51 and the second portion 52, the joining member 53 supports the portion not fixed to the underbody 22. Moreover, the one portion need not be smaller than the other portion. That is, the first portion 51 and the second portion 52 may be of the same size, or the portion supported by the joining member 53 may be greater in size. Moreover, the stator 20 or other components may include a support for supporting at least either the joining member 53 or the first portion 51 according to the present embodiment. Furthermore, the support may have a configuration (for example, an adhesive agent, an adhesive tape, or a locking member such as a projection) for fixing at least either the joining member 53 or the first portion 51 according to the present embodiment.

The bending positions 55*a* and 55*b* in the substrate 50 may not have fold lines formed thereat. Moreover, the post-bending bending positions 55*a* and 55*b* may be curved. In that case, the rotation central axis of the curving motion of the substrate represents the bending axis. However, in this case, the two bending positions (for example, the bending positions 55*a* and 55*b*) have an identical curved shape. Moreover, in this case, the first point and the second point are present on the same straight line running along the pre-bending substrate, and the straight line intersects the first axis and the second axis at right angles in a raised manner. The substrate 50 may be partially or entirely curved so as to ensure that the generator 41 and the detector 35 are positioned opposite to each other. In that case, instead of the bending process described earlier, a curving process for forming the substrate into such a shape is performed and the shape of the substrate 50 is determined. More particularly, in the substrate 50, part of the joining member 53 or the entire joining member 53 becomes curved, so that the generator 41 and the detector 35 are positioned opposite to each other. However, the portion to be curved is not limited to this example, and can be appropriately changed.

The substrate is not limited to be a flexible substrate. The substrate in the present invention can be any substrate that enables the target area for detection to be allocated in between the generator 41 and the detector 35, includes the first portion 51 on which the generator 41 generating the detection target is installed and the second portion 52 on which the detector 35 capable of detecting the detection target is installed, and has the first portion 51 and the second portion 52 formed in an integrated manner. For example, a substrate may be used that is made of a material that can be bended or curved at a portion subjected to treatment such as heating, and the portion between the first portion and the second portion (for example, the joining member) may be subjected to the treatment and bent or curved to make the first portion and the second portion be opposite to each other. Alternatively, it is possible to use a rigid-flexible substrate that has a not-easily-deformable portion and an easily-deformable portion. In that case, the not-easily-deformable portion is used as the first portion and the second portion, and the easily-deformable portion can be used as the portion between the first portion and the second portion (for example, as the joining member). With that, the first portion and the second portion can be made to be opposite to each other.

The harness portion 54 may be omitted. Alternatively, there may be two or more extending parts that function as harness portions. Moreover, the extending direction of the extending parts functioning as harness portions can be any direction, and is not restricted by the positional relationship with other configurations in the substrate 50 such as the joining member 53.

With respect to the relative movement of the motion body and the substrate 50, one component may move closer to the other component, or both components may move closer to each other. More particularly, for example, to cause the first member (the underbody 22) and the second member (the body 21) to be in proximity to each other during the assembly of the sensor 31, one member (for example, the underbody 22) may be moved while the other member (for example, the body 21) is kept fixed. Alternatively, the relationship of the fixed member and moving member may be reversed, or both members may be moved.

The specific pattern of the signal track T1 of the optical scale 11 and the pattern of the polarization layers PP1 to PP4 formed in the detector 35 can be appropriately changed. The patterns are determined by taking into account a relationship between the pattern of the configuration (for example, the optical scale 11) that is provided in the target area for detection and that causes polarization and the pattern of the configuration (for example, the polarization layers) that lets the light through during the detection.

The configuration provided in the target area for detection is not limited to the optical scale 11 that is responsible for polarization. For example, instead of using the optical scale 11, a tabular member may be used that has a hole or a transmitting portion for letting the light through or for transmitting the light in a selective manner according to the rotary angle of the rotor 10. In that case, the changes in the rotary angle of the rotor 10 appear in the form of changes in the position and the timing of detection of the light by the detector. Herein, the detector may not include the polarization layers PP1 to PP4. If a signal indicating the position of detection of the light is output from the sensor, then it is possible to detect the angular position of the rotary machine coupled to the shaft 12. Moreover, in that case, the detector need not include the four light receiving devices. For example, only a single light receiving device may be used or a plurality of light receiving devices may be used. When a single light receiving device is used, while treating the distance from the center of the detection area of the detection target to be detected by the single light receiving device (i.e., the center of the light receiving area) and the second axis LB as the distance W2, it is desirable that the distance W2 and the distance W1 are set to be equal. When a plurality of light receiving devices is used, while treating the distance between the placement center of a plurality of detection areas of the detector made of the light receiving devices and the second axis LB as the distance W2, it is desirable that the distance W2 and the distance W1 are set to be equal.

The light emitting device of the generator 41 for emitting light is not limited to a light-emitting diode. Alternatively, the light emitting device may be a point light source or a surface light source. When the light emitting device is a surface light source, with the center of the light emitting area of the surface light source being equivalent to the light emission point 41S according to the embodiment described above, it becomes possible to define a straight line that passes through the center of the light emission face of the light emitting device and that runs along the direction in which the light emitting device and the light receiving devices are opposite to each other. While treating the straight line defined as above to be equivalent to the straight line L2 illustrated in FIG. 12, the placement of the four light receiving devices can be determined in a manner identical to the embodiment described above. That is, the placement of the four light receiving devices can be determined in such a way that they are positioned equidistantly from the straight line at different positions on a predetermined plane orthogonal to the straight line and that the four line segments connecting the point of intersection between the straight line and the predetermined plane with the centers of the light receiving areas of the four light receiving devices are at right angles with each other. The outgoing surface 41T may be used as the center in place of the light emission point 41S.

In the embodiment described above, components (the IC circuit 60 and the support substrate 65) functioning as supporting members that maintain, in a plane, the faces having electronic components installed thereon (i.e., the top faces 51A and 52A) are disposed on the first portion 51 as well as on the second portion 52. However, those components need not be disposed on both portions. According to the placement of the components installed on the FPC used as the substrate 50 in the present invention, the supporting members can be appropriately changed and can be disposed on only either the first portion or the second portion. Besides, a supporting member can be disposed also in the joining member 53.

The electromagnetic waves representing the detection target are not limited to be the light or the laser light emitted from a light-emitting diode. That is, the electromagnetic waves representing the detection target may be invisible light such as infrared light or ultraviolet light, or may be X-rays. Alternatively, the detection target may be in the form of magnetic force. In that case, the generator generates a magnetic field using the magnetic force. The detector performs sensing by detecting changes in the magnetic force that are attributed to the changes in the physical quantity (for example, passing of an object) in the target area for detection. Since the magnetic force represents the detection target, the changes in the target area for detection can be detected from the changes in the magnetic force. Alternatively, other than the magnetic force, the electromagnetic waves may be sound waves including ultrasonic sound waves, ions such as plasma, or cathode rays (electron rays). As long as the detection target undergoes changes due to the changes in the physical quantity of the configuration disposed in the target area for detection, any type of detection target can be used.

The changes in the physical quantity may occur due to the linear motion of a linear motion body present in the target area for detection. In this case, the linear motion of the linear motion body can be treated as the sensing target for the sensor. Moreover, the sensor can function as a linear encoder. More particularly, the sensor functions as a linear encoder when the detector detects the changes attributed to a configuration (for example, a scale) that performs relative linear motion within the target area for detection with respect to the first portion 51 and the second portion 52, and performs sensing related to the linear motion of that configuration. Thus, according to the present invention, the presence or absence of motion of a linear motion body coupled with the encoder can be detected along with detecting the position of motion. As described above in the embodiment, if the motion body is a rotary body (the optical scale 11 attached to the end portion of the shaft 12), then the portion close to the shaft 12 does not enter the area (the target area for detection). Thus, only some portion of the motion body enters the area. However, when the motion body is a linear motion body, at least some portion of the motion body naturally enters the area. Moreover, depending on the possible movement range for the linear motion body, the entire linear motion body may also enter the area (for example, passing inside and outside the area). In this way, the motion body may be any member having at least some portion moving in the area in between the generator and the detector.

The shape of the stator 20, which functions as the housing, can be appropriately changed. Explained below with reference to FIGS. 29 and 30 is a sensor 31A in which a stator 20A having a different outer shape than the example illustrated in FIG. 2 is used.

Figure 29:
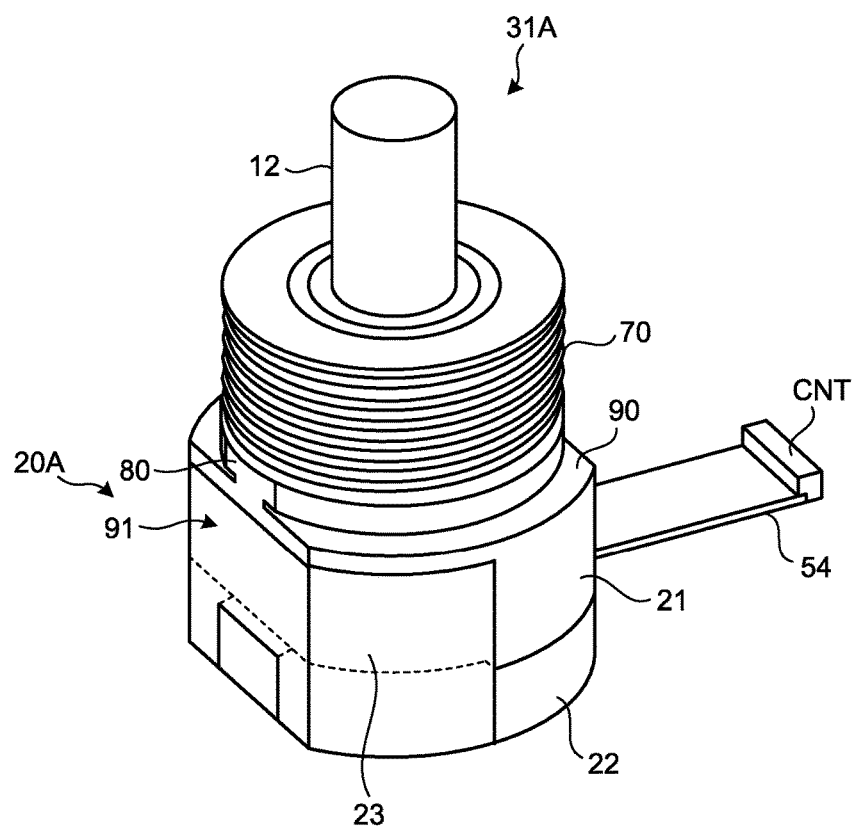
FIG. 29 is an external perspective view of a sensor in which a stator having a different outer shape than the example illustrated in FIG. 2 is used.
Figure 30:
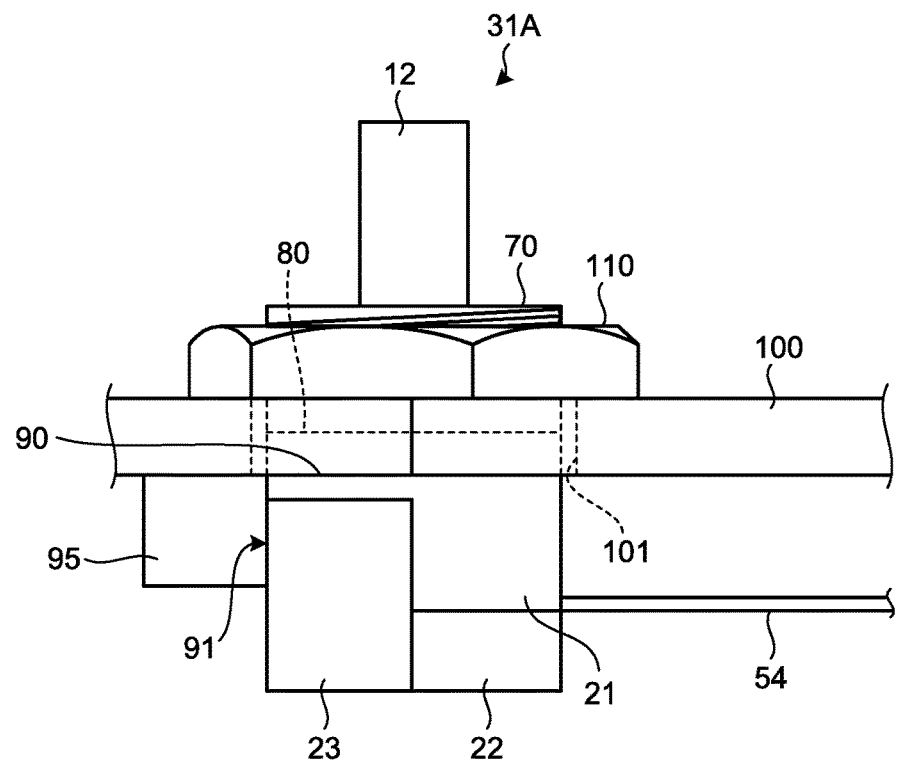
FIG. 30 is a diagram illustrating the sensor mounted in a hole formed in a tabular member.

FIG. 29 is an external perspective view of the sensor 31A in which the stator 20A having a different outer shape than the example illustrated in FIG. 2 is used. FIG. 30 is a diagram illustrating the sensor 31A that is mounted in a hole 101 formed in a tabular member 100. The stator 20A includes an extending part 70, an in-low part 80, and an engaging part 90. More particularly, as illustrated in FIG. 29, in the stator 20A, the extending part 70 and the engaging part 90 are positioned opposite to each other across the in-low part 80. That is, the extending part 70 extends on the side opposite to the engaging part 90 across the in-low part 80.

The in-low part 80 fits in the hole 101 in which the sensor 31A is mounted. More particularly, for example, the in-low part 80 has the outer periphery that abuts against the inner periphery of the hole 101, which is formed on the member 100 in which the sensor 31A is mounted. More particularly, the in-low part 80 of the sensor 31A illustrated in FIG. 29 has an arc-like outer periphery running along the inner periphery of the circular hole 101. The arc-like outer periphery may make a complete circle or may have some portion cut out in a straight line as illustrated in FIG. 29.

Figure 31:
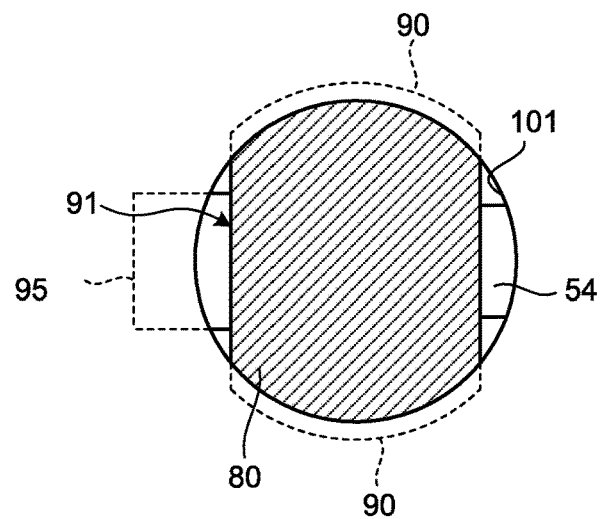
FIG. 31 is a diagram illustrating an exemplary cross-sectional shape of an in-low part.

FIG. 31 is a diagram illustrating an exemplary cross-sectional shape of the in-low part 80. As illustrated in FIG. 31, when the hole 101 has the inner periphery forming a circular arc, for example, when the hole 101 is circular in shape, it is simply required that the diameter of the in-low part 80 along the plane orthogonal to the direction of extension of the shaft 12 corresponds to the inner diameter of the hole 101. When the in-low part 80 fits in the hole 101, the position of the sensor 31A on the board surface of the member 100 becomes fixed. After fitting in the hole 101, the outer periphery of the in-low part 80 abuts against the inner periphery of the hole 101. With that, in the direction along the board surface of the member 100, the misalignment of the sensor 31A with respect to the member 100 is prevented from occurring.

The engaging part 90 has an outer diameter greater than the diameter of the hole 101. The extending part 70 has such an outer diameter that it can pass through the hole 101. Thus, although the extending part 70 can pass through the hole 101, the engaging part 90 cannot pass through the hole 101. The worker who mounts the sensor 31A in the hole 101 of the member 100 relatively-moves the sensor 31A and the member 100 in such a way that the sensor 31A enters the hole 101 from the extending part 70 side. Because of the relative movement, the extending part 70 passes through the hole 101; the in-low part 80 is fit in the hole 101; and the engaging part 90 abuts against the member 100. As a result of the abutment of the engaging part 90 against the member 100, the sensor 31A is positioned with respect to the member 100 in the direction of extension of the shaft 12.

The extending part 70 has a columnar outer shape and has an external thread on the outer periphery thereof. More particularly, on the outer periphery of the extending part 70, an external thread is screwed in with the direction of extension of the shaft 12 serving as the central axis. The worker who fits the sensor 31 in the hole 101 of the member 100 screws a nut 110, which has passed through a female screw, together with the extending part 70 extending from the hole 101. The nut 110 has an outer diameter greater than the diameter of the hole 101. As a result, the nut 110 and the engaging part 90 sandwich the member 100 across the in-low part 80, and thus the sensor 31A is fixed to the member 100.

In the direction of extension of the shaft 12, the in-low part 80 is set to have a width smaller than the width of the member 100. With that, the external thread can be screwed up to the inside of the hole 101. As a result, the member 100 can be held by the nut 110 and the engaging part 90 more reliably, and thus the sensor 31A can be fixed to the member 100 more reliably.

The engaging part 90 has an abutting part 91 that abuts against a baffle 95 disposed on the member 100 in which the sensor 31 is mounted. More particularly, for example, as illustrated in FIGS. 29 to 31, the baffle 95 is disposed on that face of the tabular member 100 on the engaging part 90 side, the tabular member 100 having the sensor 31A fit thereon in the hole 101. The baffle 95 is, for example, a cuboid member and is fixed to the tabular member 100. The abutting part 91 is formed as, for example, a planar part obtained by cutting out some portion of the cylindrical outer periphery of the engaging part 90 such that the abutting part 91 abuts against the baffle 95. Moreover, the abutting part 91 is formed at a different position than the position of extension of the harness portion 54. More particularly, for example, the abutting part 91 is formed on the cover 23 that is positioned on the side opposite to the position of extension of the harness portion 54.

At the time of screwing the nut 110 into the extending part 70, a rotative force is transmitted to the extending part 70. However, since the baffle 95 and the abutting part 91 abut against each other, the baffle 95 locks the sensor 31A in the direction of rotation attributed to the rotative force. This prevents the sensor 31A from rotating in tandem with the screwing of the nut 110. The portion where the abutting part 91 and the baffle 95 abut against each other is not limited to be planar, and can be appropriately changed. As long as the stator 20A is locked due to the abutment of the abutting part 91 and the baffle 95 thereby preventing the rotary motion accompanying the screwing, it serves the purpose.

As described above, the stator 20A includes the in-low part 80, the engaging part 90, and the extending part 70. The extending part 70 has a columnar outer shape, has an external thread on the outer periphery thereof, and has such an outer diameter that it can pass through the hole 101. With that, the installation of the sensor 31A using a screwing member such as the nut 110 can be performed with more ease.

Moreover, the hole 101 may a circular hole, and the in-low part 80 may have an arc-like outer periphery that abuts against the inner periphery of the circular hole 101. In this case, when the engaging part 90 has the abutting part 91 abutting against the baffle 95, the sensor 31A can be prevented from rotating in tandem with the screwing of the nut 110. With that, the fixing of the sensor 31A by screwing the nut 110 can be performed with more ease.

The invention claimed is:

1. A sensor manufacturing method for a sensor including
    a generator that generates a predetermined detection target,
    a detector that detects the detection target generated by the generator, and
    a motion body that performs motion in an area in between the generator and the detector,
    the sensor manufacturing method comprising:
    positioning the generator and the detector opposite to each other by either curving or bending a substrate including a first portion having the generator installed thereon and a second portion having the detector installed thereon that are formed in an integrated manner; and
    making the substrate and the motion body perform relative movement in such a way that the motion body enters the area in between the generator and the detector.

2. The sensor manufacturing method according to claim 1, wherein
    the substrate includes a joining member that joins the first portion and the second portion, and
    the substrate and the motion body are made to perform the relative movement in such a way that the motion body enters the area from a side opposite to the joining member.

3. The sensor manufacturing method according to claim 1, wherein
    the first portion and the second portion after curving or bending the substrate are parallel to each other, and
    a direction of the relative movement of the substrate and the motion body is along the first portion and the second portion.

4. The sensor manufacturing method according to claim 1, wherein
    the motion body is a disk-shaped member that is supported in a rotatable manner via a shaft, and
    a notch is formed in at least either the first portion or the second portion for ensuring that the shaft and the substrate do not make contact with each other while the motion body remains in the area in between the generator and the detector.

5. The sensor manufacturing method according to claim 1, wherein
    the substrate is mounted on a first member representing one of a plurality of members constituting a housing, and
    a second member, which represents one of the plurality of members constituting the housing and which supports the motion body, and the first member are brought closer to each other so as to assemble the housing and to make the substrate and the motion body perform relative movement so that the motion body enters the area in between the generator and the detector.

6. The sensor manufacturing method according to claim 5, wherein, after the first member and the second member are assembled, an entrance for the substrate as formed in the second member is covered by a cover member.

7. A sensor comprising:
    a generator that generates a predetermined detection target;
    a detector that detects the detection target generated by the generator;
    a substrate on which the generator and the detector are installed;
    a motion body that performs motion in an area in between the generator and the detector; and a housing that houses the generator, the detector, and the motion body, wherein the substrate has a first portion, on which the generator is installed, and a second portion, on which the detector is installed, formed in an integrated manner, has a curved shape or a bent shape in such a way that the generator and the detector are positioned opposite to each other, and is disposed at such a position that the motion body is present in the area in between the generator and the detector, and the housing includes a first member on which the substrate is mounted and includes a second member at which the motion body is installed.

8. The sensor according to claim 7, wherein the housing includes a cover member for covering an entrance for the substrate as formed in the second member.

9. The sensor according to claim 7, wherein the housing includes:

an in-low part that fits in a hole formed in a member on which the sensor is mounted;

an engaging part that has an outer diameter greater than a diameter of the hole; and an extending part that extends on a side opposite to the engaging part across the in-low part, and the extending part has a columnar outer shape, has an external thread on outer periphery thereof, and has an outer diameter small enough to be able to pass through the hole.

10. The sensor according to claim 9, wherein the hole is a circular hole, the in-low part has an arc-like outer periphery that abuts against an inner periphery of the circular hole, and the engaging part has an abutting part that abuts against a baffle disposed on the member.

\* \* \* \* \*